(12) United States Patent  
Barrall et al.

(10) Patent No.: US 8,028,115 B2
(45) Date of Patent: Sep. 27, 2011

(54) FILE SYSTEM ADAPTER FOR HARDWARE IMPLEMENTATION OR ACCELERATION OF FILE SYSTEM FUNCTIONS

(75) Inventors: Geoffrey S. Barrall, San Jose, CA (US); Trevor E. Willis, Buckinghamshire (GB); Simon L. Benham, Berkshire (GB); Michael Cooper, Berkshire (GB); Jonathan Meyer, Surrey (GB); Christopher J. Aston, Bucks (GB); John Winfield, Berkshire (GB)

(73) Assignee: BlueArc UK Limited, Bracknell, Berkshire (GB)

( * ) Notice: Subject to any disclaimer, the term of this patent is extended or adjusted under 35 U.S.C. 154(b) by 124 days.

(21) Appl. No.: 12/535,402

(22) Filed: Aug. 4, 2009

(65) Prior Publication Data

US 2009/0292850 A1 Nov. 26, 2009

Related U.S. Application Data

(60) Division of application No. 10/889,158, filed on Jul. 12, 2004, which is a continuation of application No. 09/879,798, filed on Jun. 12, 2001, now Pat. No. 6,826,615, which is a continuation-in-part of application No. 09/418,558, filed on Oct. 14, 1999, now abandoned.

(51) Int. Cl.
*H05K 7/10* (2006.01)
(52) U.S. Cl. ............... 710/301; 709/216; 711/147
(58) Field of Classification Search .......... 709/213–216, 709/227–229, 201; 711/147, 207; 718/100; 710/301, 105
See application file for complete search history.

(56) References Cited

U.S. PATENT DOCUMENTS

| | | | | | |
|---|---|---|---|---|---|
| 4,096,567 | A | * | 6/1978 | Millard et al. | 1/1 |
| 4,240,143 | A | * | 12/1980 | Besemer et al. | 710/104 |
| 4,253,144 | A | * | 2/1981 | Bellamy et al. | 709/226 |
| 4,326,248 | A | * | 4/1982 | Hinai et al. | 711/209 |
| 4,396,983 | A | * | 8/1983 | Segarra et al. | 709/227 |
| 4,412,285 | A | * | 10/1983 | Neches et al. | 709/252 |
| 4,414,624 | A | * | 11/1983 | Summer et al. | 712/21 |
| 4,456,957 | A | * | 6/1984 | Schieltz | 710/4 |
| 4,459,664 | A | * | 7/1984 | Pottier et al. | 718/105 |
| 4,488,231 | A | * | 12/1984 | Yu et al. | 710/48 |
| 4,494,188 | A | * | 1/1985 | Nakane et al. | 718/102 |
| 4,608,631 | A | * | 8/1986 | Stiffler et al. | 710/113 |
| 4,685,125 | A | * | 8/1987 | Zave | 700/1 |
| 4,709,325 | A | * | 11/1987 | Yajima | 714/10 |
| 4,783,730 | A | * | 11/1988 | Fischer | 710/5 |
| 4,797,854 | A | * | 1/1989 | Nakazaki et al. | 715/700 |
| 5,987,506 | A | * | 11/1999 | Carter et al. | 709/213 |
| 6,826,615 | B2 | * | 11/2004 | Barrall et al. | 709/227 |

* cited by examiner

*Primary Examiner* — Clifford H Knoll
(74) *Attorney, Agent, or Firm* — Sunstein Kann Murphy & Timbers LLP

(57) ABSTRACT

A file system adapter card that may be plugged into a host computer system for providing hardware-based file system accesses outside the purview of a host operating system running on the host computer system. The file system adapter card includes a hardware-implemented or hardware-accelerated file service subsystem and a computer bus that permits a host computer system to communicate directly with the file service subsystem for providing file service requests and receiving file service responses. The file service subsystem includes dedicated hardware that operates outside the immediate control of a host operating system, including specialized circuitry for performing at least one major subsystem function.

45 Claims, 25 Drawing Sheets

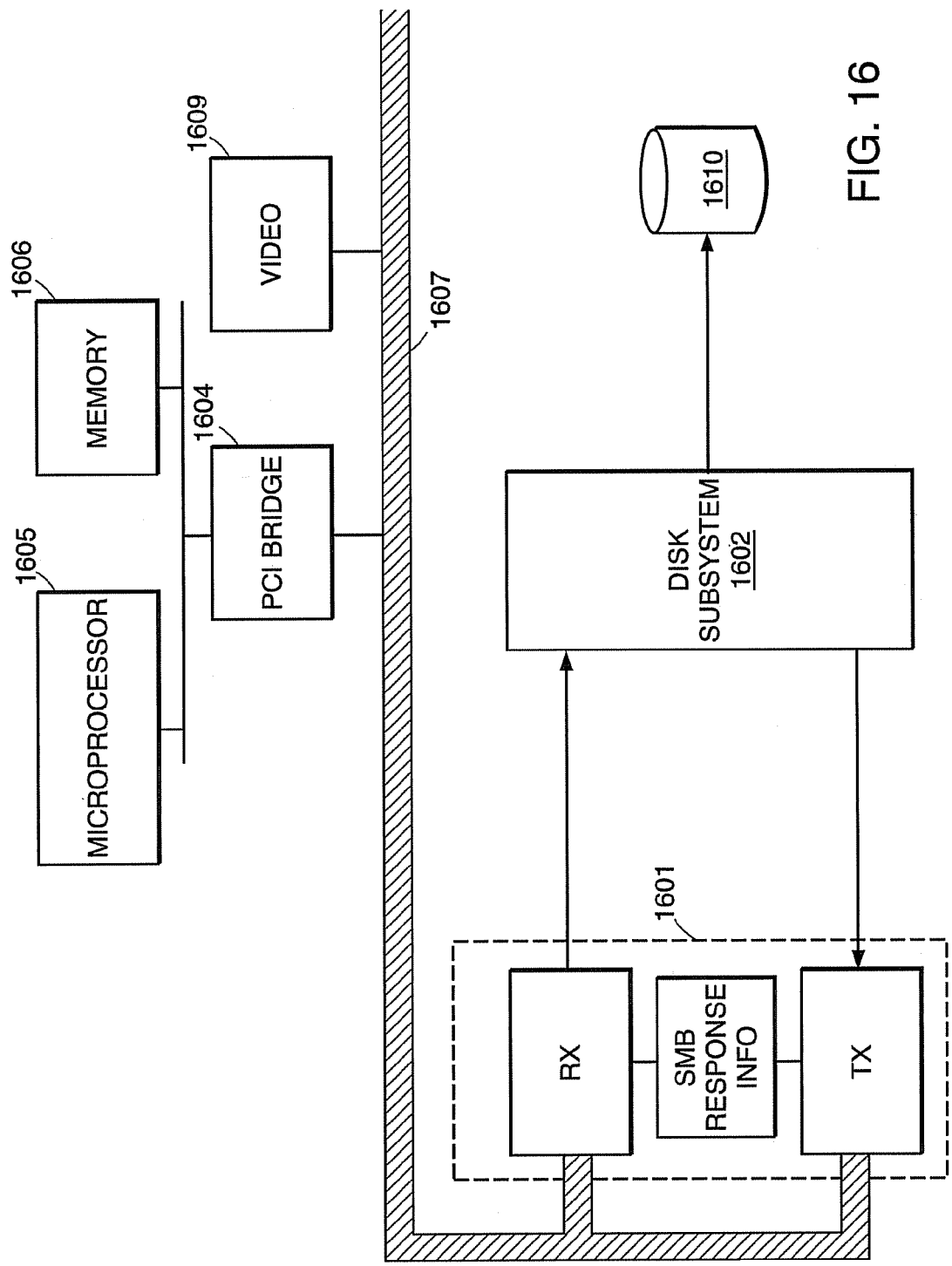

FILE SYSTEM ADAPTER FOR HARDWARE IMPLEMENTATION OR ACCELERATION OF FILE SYSTEM FUNCTIONS

This application is a divisional of, and therefore claims priority from, U.S. patent application Ser. No. 10/889,158 filed Jul. 12, 2004, which is a continuation of U.S. patent application Ser. No. 09/879,798 filed Jun. 12, 2001 (now U.S. Pat. No. 6,826,615), which is a continuation-in-part of U.S. patent application Ser. No. 09/418,558 filed Oct. 14, 1999 (currently abandoned).

Each of the above-referenced patent applications is hereby incorporated herein by reference in its entirety.

TECHNICAL FIELD

The present invention relates to operating system functions and hardware implementation or acceleration of such functions.

BACKGROUND ART

Operating systems in computers enable the computers to communicate with external resources. The operating system typically handles direct control of items associated with computer usage including keyboard, display, disk storage, network facilities, printers, modems, etc. The operating system in a computer is typically designed to cause the central processing unit ("CPU") to perform tasks including the managing of local and network file systems, memory, peripheral device drivers, and processes including application processes. Placing responsibility for all of these functions on the CPU imposes significant processing burdens on it, particularly when the operating system is sophisticated, as, for example, in the case of Windows NT (available from Microsoft Corporation, Redmond, Wash.), Unix (available from many sources, including from SCO Software, Santa Cruz, Calif., and, in a version called "Linux" from Red Hat Software, Cambridge, Mass.), and NetWare (available from Novell, Provo, Utah). The more the burden is placed on the CPU to run processes other than those associated with applications, the less CPU time is available to run applications with the result that performance of the applications may be degraded. In addition, the throughput of devices external to the CPU is subject to the limitations imposed by the CPU when the operating system places responsibility for managing these devices on the CPU. Furthermore, reliability of the overall software-hardware system, including the CPU, running the operating system, in association with the devices, will depend, among other things, on the operating system. Owing to the inherent complexity of the operating system, unforeseen conditions may arise which may undermine stability of the overall software-hardware system.

SUMMARY OF THE INVENTION

In one aspect of the invention, there is provided apparatus for handling service requests over a network, wherein the network utilizes a protocol. The apparatus includes a network subsystem (a) for receiving, via a network receive interface, service requests using the network protocol and forwarding such requests to a service output and (b) for receiving, via a service input, data to satisfy network requests and transmitting, via a network transmit interface, such data using the network protocol. The apparatus also includes a service subsystem having (a) a service request receive interface coupled to the service output of the network subsystem and (b) a service request transmit interface coupled to the service input of the network subsystem for delivering data to the network subsystem satisfying the network service requests. In this aspect, a first data path runs in a first direction from the network receive interface through the network subsystem via the service output to the service subsystem and a second data path runs in a second direction from the service subsystem into the network subsystem at the service input and through the network subsystem to the network transmit interface. The network subsystem and the service subsystem may be implemented on a single circuit board or on separate circuit boards. The protocol may include IP.

The service subsystem may include a service module, a file system module, and a storage module. The service module is coupled to the network subsystem, the file system module is coupled to the service module, and the storage module is coupled to the file system module and has an interface with a file storage arrangement. Each of the service module, the file system module, and the storage module has (i) a first input and a first output corresponding to the first data path and (ii) a second input and a second output corresponding to the second data path.

The service requests may involve reading and/or writing data to long-term storage. The long-term storage may include network disk storage accessible to computers over the network and/or local disk storage that is accessible to a local computer but not to any other computers over the network. The long-term storage may be associated with the provision of E-Mail service over a network. The long-term storage may provide access to web pages over a network.

The network subsystem may include dedicated hardware that operates outside the immediate control of a software program. The dedicated hardware includes specialized circuitry for performing at least one major subsystem function.

Similarly, the service subsystem may include dedicated hardware that operates outside the immediate control of a software program. The dedicated hardware includes specialized circuitry for performing at least one major subsystem function. The service requests may involve access of data in a storage system, in which case the service subsystem may include a module including hardware operating outside the immediate control of a software program for managing storage of the data in the storage system.

In one exemplary embodiment of such a service subsystem, the apparatus is a file server. The data in the storage system are arranged in files, and the service requests may involve requests for files in the storage system. The service subsystem includes a module including hardware operating outside the immediate control of a software program for managing a file system associated with the storage system. The protocol may include a file system protocol defining operations including file read and file write.

In another exemplary embodiment of such a service subsystem, the apparatus is a web server. The data in the storage system may include web pages, and the service requests may involve requests for web pages in the storage system. The storage system may have a storage protocol, in which case the service subsystem may include a module including hardware operating outside the immediate control of a software program for interfacing with the storage system.

In another aspect of the invention, there is provided apparatus for handling service requests over a network, wherein the network utilizes a protocol. The apparatus includes a network subsystem for receiving and transmitting network service requests using the network protocol and a service subsystem, coupled to the network subsystem, for satisfying a first predetermined set of the network service requests. In this aspect, the network subsystem and the service subsystem are interconnected by a first unidirectional communication link for conveying data from the network subsystem to the service subsystem and by a second unidirectional communication link for conveying data from the service subsystem to the network subsystem. The network subsystem and the service subsystem may be implemented on a single circuit board or on separate circuit boards. The protocol may include IP.

The service subsystem may include a service module, a file system module, and a storage module. The service module is coupled to the network subsystem via the first unidirectional communication link and the second unidirectional communication link, the file system module is coupled to the service module, and the storage module is coupled to the file system module and has an interface with a file storage arrangement. Each of the service module, the file system module, and the storage module has (i) a first input and a first output corresponding to a first data path associated with the first unidirectional communication link and (ii) a second input and a second output corresponding to a second data path associated with the second unidirectional communication link.

The service requests may involve reading and/or writing data to long-term storage. The long-term storage may include network disk storage accessible to computers over the network and/or local disk storage that is accessible to a local computer but not to any other computers over the network. The long-term storage may be associated with the provision of E-Mail service over a network. The long-term storage may provide access to web pages over a network.

The network subsystem may include dedicated hardware that operates outside the immediate control of a software program. The dedicated hardware includes specialized circuitry for performing at least one major subsystem function.

Similarly, the service subsystem may include dedicated hardware that operates outside the immediate control of a software program. The dedicated hardware includes specialized circuitry for performing at least one major subsystem function. The service requests may involve access of data in a storage system, in which case the service subsystem may include a module including hardware operating outside the immediate control of a software program for managing storage of the data in the storage system.

In one exemplary embodiment of such a service subsystem, the apparatus is a file server. The data in the storage system are arranged in files, and the service requests may involve requests for files in the storage system. The service subsystem includes a module including hardware operating outside the immediate control of a software program for managing a file system associated with the storage system. The protocol may include a file system protocol defining operations including file read and file write.

In another exemplary embodiment of such a service subsystem, the apparatus is a web server. The data in the storage system may include web pages, and the service requests may involve requests for web pages in the storage system. The storage system may have a storage protocol, in which case the service subsystem may include a module including hardware operating outside the immediate control of a software program for interfacing with the storage system.

In yet another aspect, there is provided scalable apparatus for handling service requests over a network, wherein the network utilizes a protocol. The scalable apparatus includes a first plurality of network subsystems for receiving and transmitting network service requests using the network protocol and a second plurality of service subsystems, for satisfying a first predetermined set of the network service requests. The network subsystems and the service subsystems are interconnected by a first unidirectional communication link for conveying data from the network subsystems to the service subsystems and by a second unidirectional communication link for conveying data from the service subsystems to the network subsystems. Each of the first and second unidirectional communication links may include a switch. Each of the first and second unidirectional communication links may include a bus.

In still another aspect, there is provided a scalable service subsystem for interfacing a storage arrangement with a network over which may be generated a storage access request. The scalable service subsystem includes a first plurality of service modules that receive network service requests and fulfill such service requests and in doing so may issue data storage access requests and a second plurality of file system modules that receive data storage access requests and fulfill such storage access requests and in doing so may issue storage arrangement access requests. The service modules and the file system modules are interconnected by a first unidirectional communication link for conveying data from the service modules to the file system modules and by a second unidirectional communication link for conveying data from the file system modules to the service modules. Each of the first and second unidirectional communication links may include a switch. Each of the first and second unidirectional communication links includes a bus.

The scalable service subsystem may further include a third plurality of storage modules that receive storage arrangement access requests and control the storage arrangement to fulfill such storage arrangement access requests. The file system modules and the storage modules are interconnected by a third unidirectional communication link for conveying data from the file system modules to the storage modules and by a fourth unidirectional communication link for conveying data from the storage modules to the file system modules. Each of the third and fourth unidirectional communication links may include a switch. Each of the third and fourth unidirectional communication links may include a bus.

BRIEF DESCRIPTION OF THE DRAWINGS

The foregoing features of the invention will be more readily understood by reference to the following detailed description, taken with reference to the accompanying drawings, in which:

FIG. 16 is a block diagram illustrating use of a file system module, such as illustrated in FIG. 3, in connection with a computer system having file storage;

DETAILED DESCRIPTION OF SPECIFIC EMBODIMENTS

For the purpose of the present description and the accompanying claims, the following terms shall have the indicated meanings unless the context otherwise requires:

A "hardware-implemented subsystem" means a subsystem wherein major subsystem functions are performed in dedicated hardware that operates outside the immediate control of a software program. Note that such a subsystem may interact with a processor that is under software control, but the subsystem itself is not immediately controlled by software. "Major" functions are the ones most frequently used.

A "hardware-accelerated subsystem" means one wherein major subsystem functions are carried out using a dedicated processor and dedicated memory, and, additionally (or alternatively), special purpose hardware; that is, the dedicated processor and memory are distinct from any central processor unit (CPU) and memory associated with the CPU.

"TCP/IP" are the protocols defined, among other places, on the web site of the Internet Engineering Task Force, at www.ietf.org, which is hereby incorporated herein by reference. "IP" is the Internet Protocol, defined at the same location.

A "file" is a logical association of data.

A protocol "header" is information in a format specified by the protocol for transport of data associated with the user of the protocol.

A "SCSI-related" protocol includes SCSI, SCSI-2, SCSI-3, Wide SCSI, Fast SCSI, Fast Wide SCSI, Ultra SCSI, Ultra2 SCSI, Wide Ultra2 SCSI, or any similar or successor protocol. SCSI refers to "Small Computer System Interface," which is a standard for parallel connection of computer peripherals in accordance with the American National Standards Institute (ANSI), having a web URL address at www.ansi.org.

Reference to "layers 3 and 4" means layers 3 and 4 in the Open System Interconnection ("OSI") seven-layer model, which is an ISO standard. The ISO (International Organization for Standardization) has a web URL address at www.iso.ch.

Figure 1:
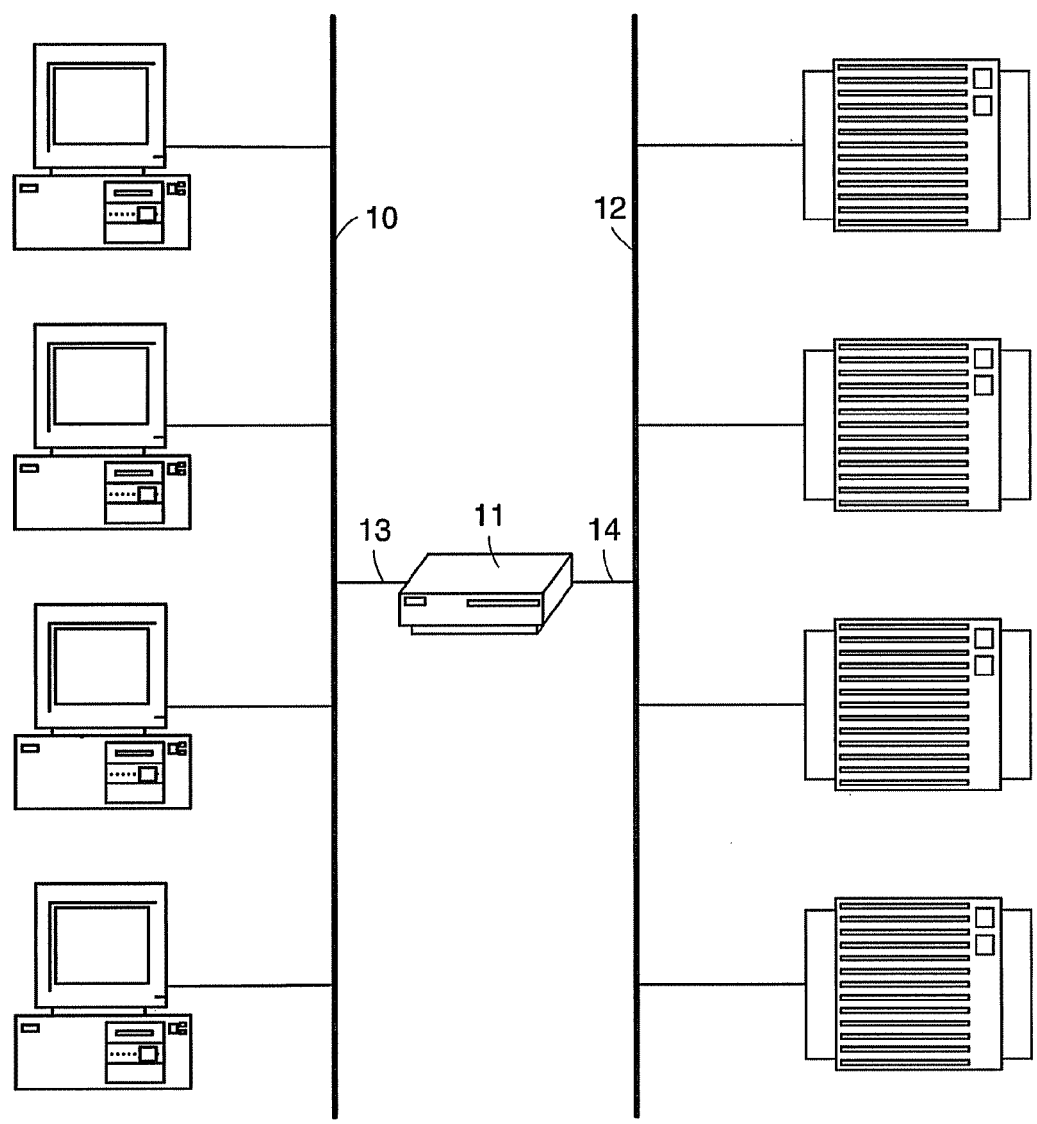
FIG. 1 is a schematic representation of an embodiment of the present invention configured to provide network services, such as a file server or a web server.

FIG. 1 is a schematic representation of an embodiment of the present invention configured to handle service requests over a network. Thus, this embodiment includes configurations in which there is provided a file server or a web server. The embodiment 11 of the present invention is coupled to the network 10 via the network interface 13. The network 10 may include, for example, communications links to a plurality of workstations. The embodiment 11 here is also coupled to a plurality of storage devices 12 via storage interconnect 14. The embodiment 11 may be hardware implemented or hardware accelerated (or utilize a combination of hardware implementation and hardware acceleration).

Figure 2:
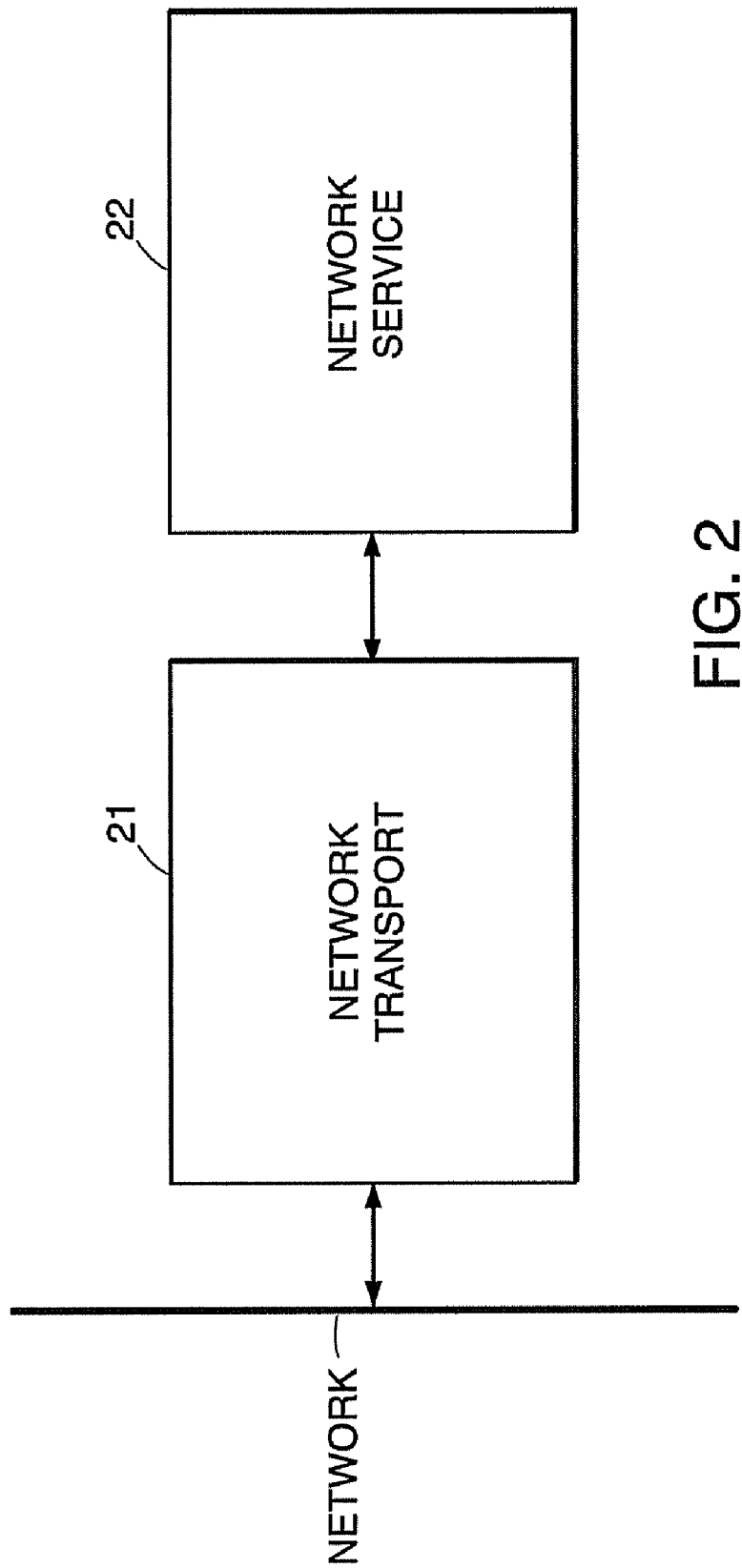
FIG. 2 is a block diagram of the embodiment illustrated in FIG. 1.

FIG. 2 is a block diagram of the embodiment illustrated in FIG. 1. The network subsystem 21 receives and transmits network service requests and responses. The network subsystem 21 is coupled to the service subsystem 22, which satisfies the network service requests. The network subsystem 21, the service subsystem 22, or both subsystems may be either hardware implemented or hardware accelerated.

Figure 3:
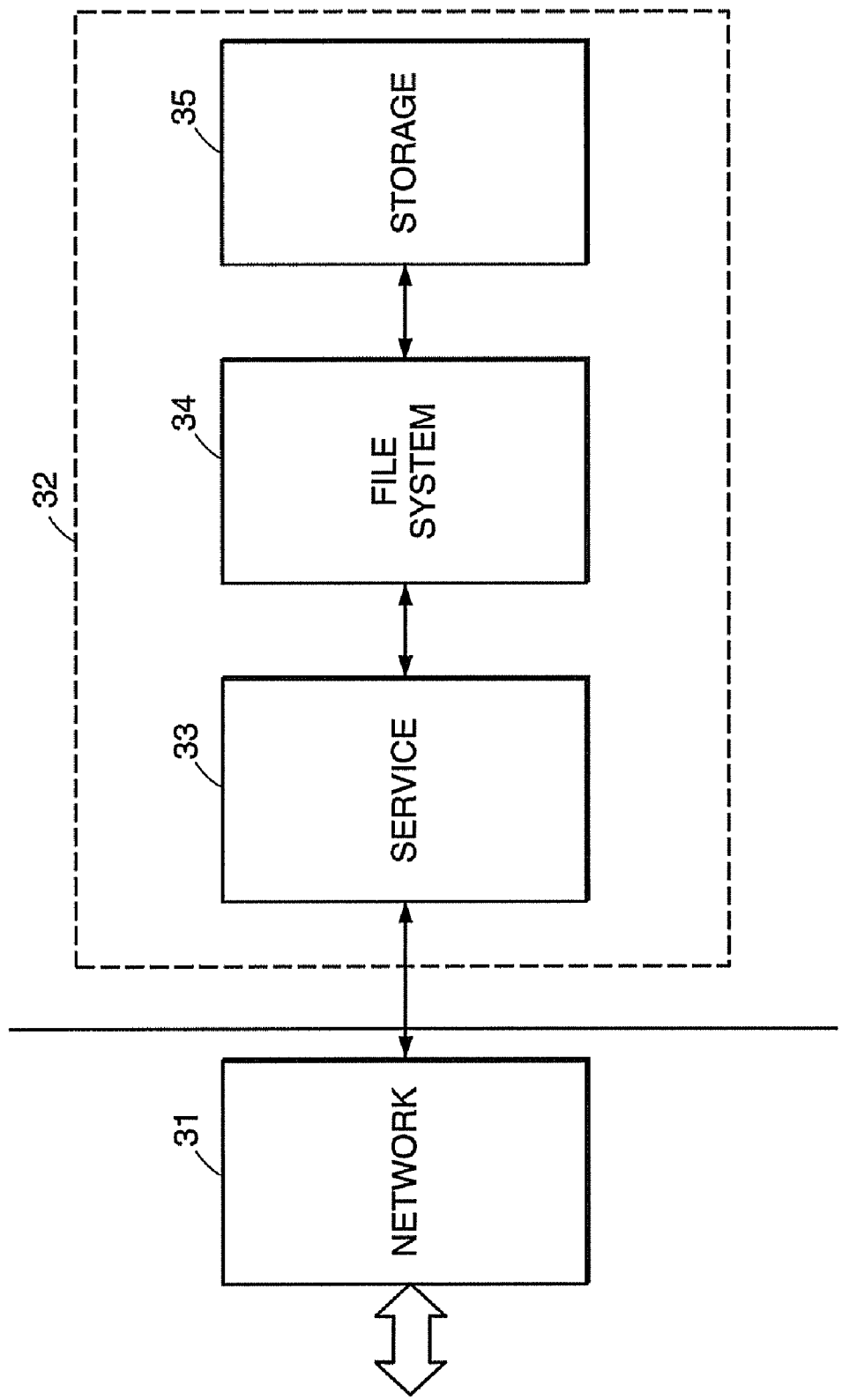
FIG. 3 is a block diagram of the embodiment of FIG. 1 configured as a file server.

FIG. 3 is a block diagram of the embodiment of FIG. 1, more particularly configured as a file server. The network subsystem 31 receives and transmits network service requests and responses. The network subsystem 31 is coupled to the service subsystem 32. The service subsystem includes three modules: the service module 33, the file system module 34, and the storage module 35. The service module 33 analyzes network service requests passed to the service subsystem 32 and issues, when appropriate, a corresponding storage access request. The network service request may be conveyed in any of a variety of protocols, such as CIFS, SMB, NFS, or FCP. The service module 33 is coupled to the file system module 34. If the network service request involves a storage access request, the file system module 34 converts requests for access to storage by converting the request into a format consistent with the file storage protocol (for example, HTFS, NTFS, FAT, FAT16, or FAT32) utilized by the storage medium. The storage module 35 converts the output of the file system module 34 into a format (such as SCSI) consistent with the bus requirements for directly accessing the storage medium to which the service subsystem 32 may be connected.

Figure 4:
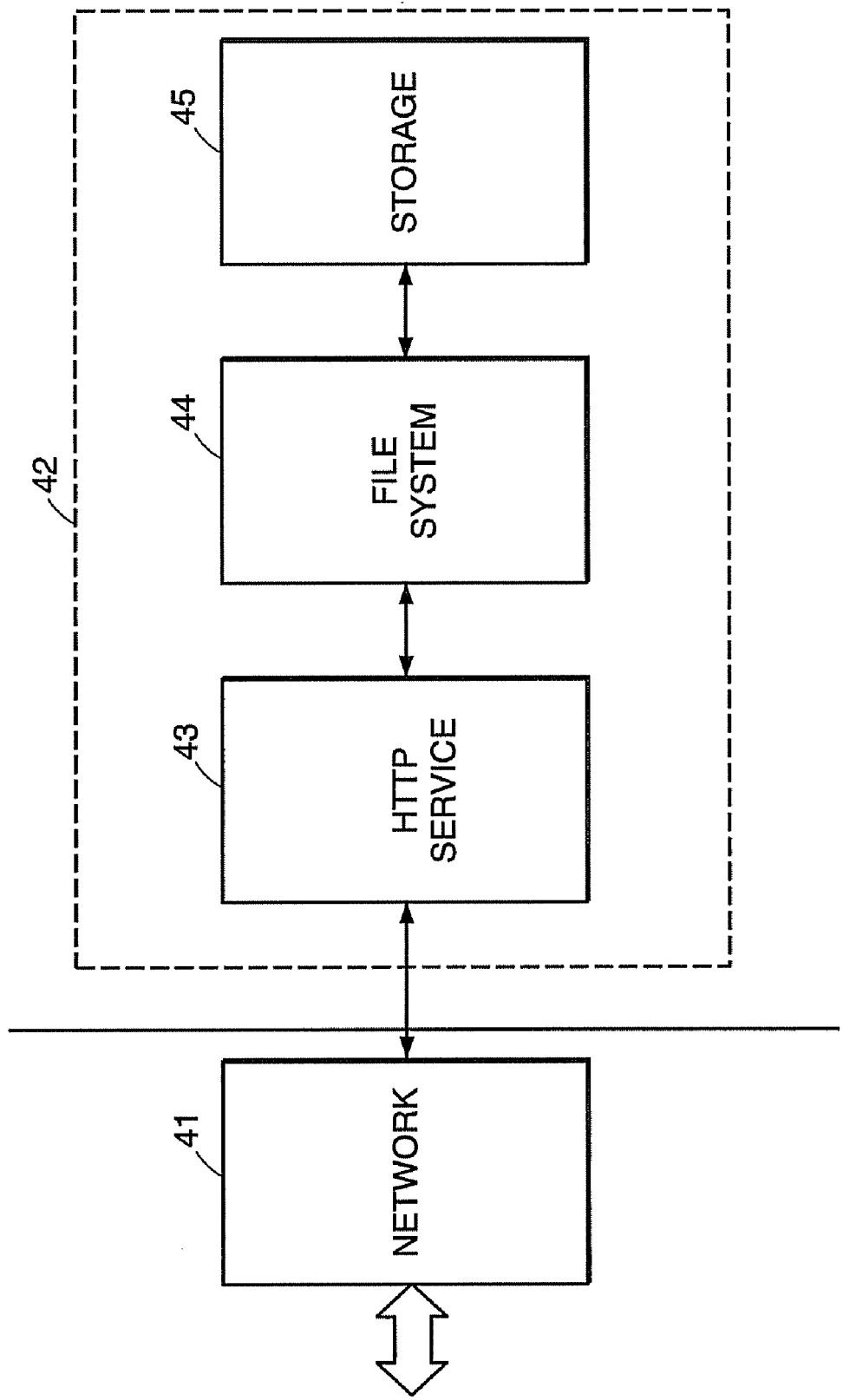
FIG. 4 is a block diagram of the embodiment of FIG. 1 configured as a web server.

FIG. 4 is similar to FIG. 3, and is a block diagram of the embodiment of FIG. 1 configured as a web server. The network subsystem 41 receives and transmits network service requests and responses. The network subsystem 41 is coupled to the service subsystem 42. The service subsystem includes three modules: the service module 43, the file system module 44, and the storage module 45. The service module 43 analyzes network service requests passed to the service subsystem 32 and issues, when appropriate, a corresponding storage access request. Here, the network service request is typically in the HTTP protocol. The service module 43 is coupled to the file system module 44, which is coupled to the storage module 45; the file system module 44 and the storage module 45 operate in a manner similar to the corresponding modules 34 and 35 described above in connection with FIG. 3.

Figure 5:
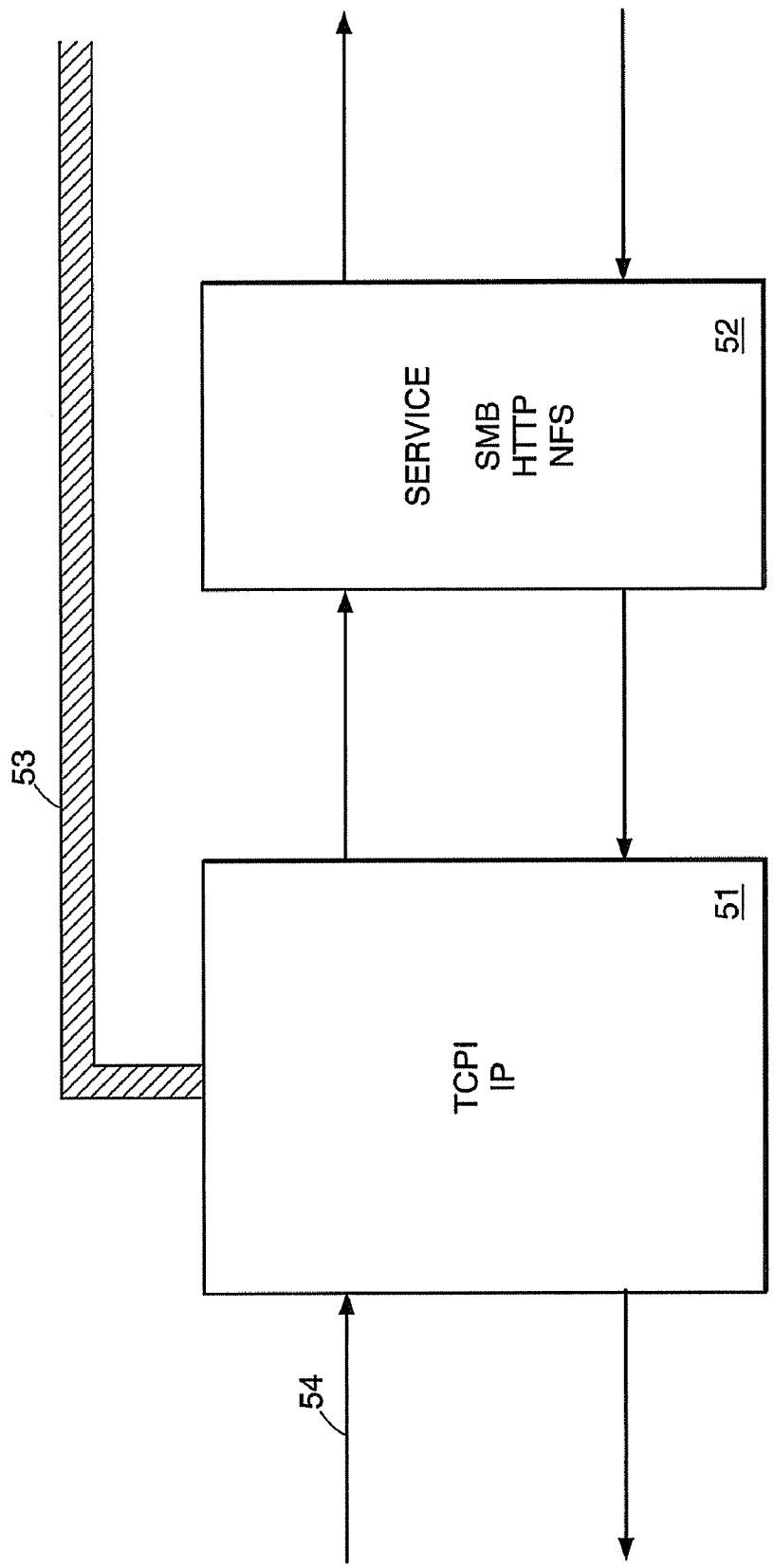
FIG. 5 is the network subsystem of the embodiments of FIGS. 2-4.

FIG. 5 is the network subsystem and service subsystem of the embodiments of FIGS. 2-4. The network subsystem 51 receives encapsulated data from the network receive interface 54 and de-encapsulates the data in accordance with the TCP/IP or other protocol bus 53. The network subsystem 51 is also coupled to the PCI bus 53 to provide to a local processor (which is also coupled to the PCI bus) to access data over the network. The network subsystem 51 also transmits the data to the service subsystem 52, and the data to be transmitted may come from the network receive interface 54 or the local processor via the PCI bus 53. The service subsystem 52, in turn, operates in a manner similar to the service subsystems 22, 32, and 42 FIGS. 2, 3, and 4 respectively.

Figure 6:
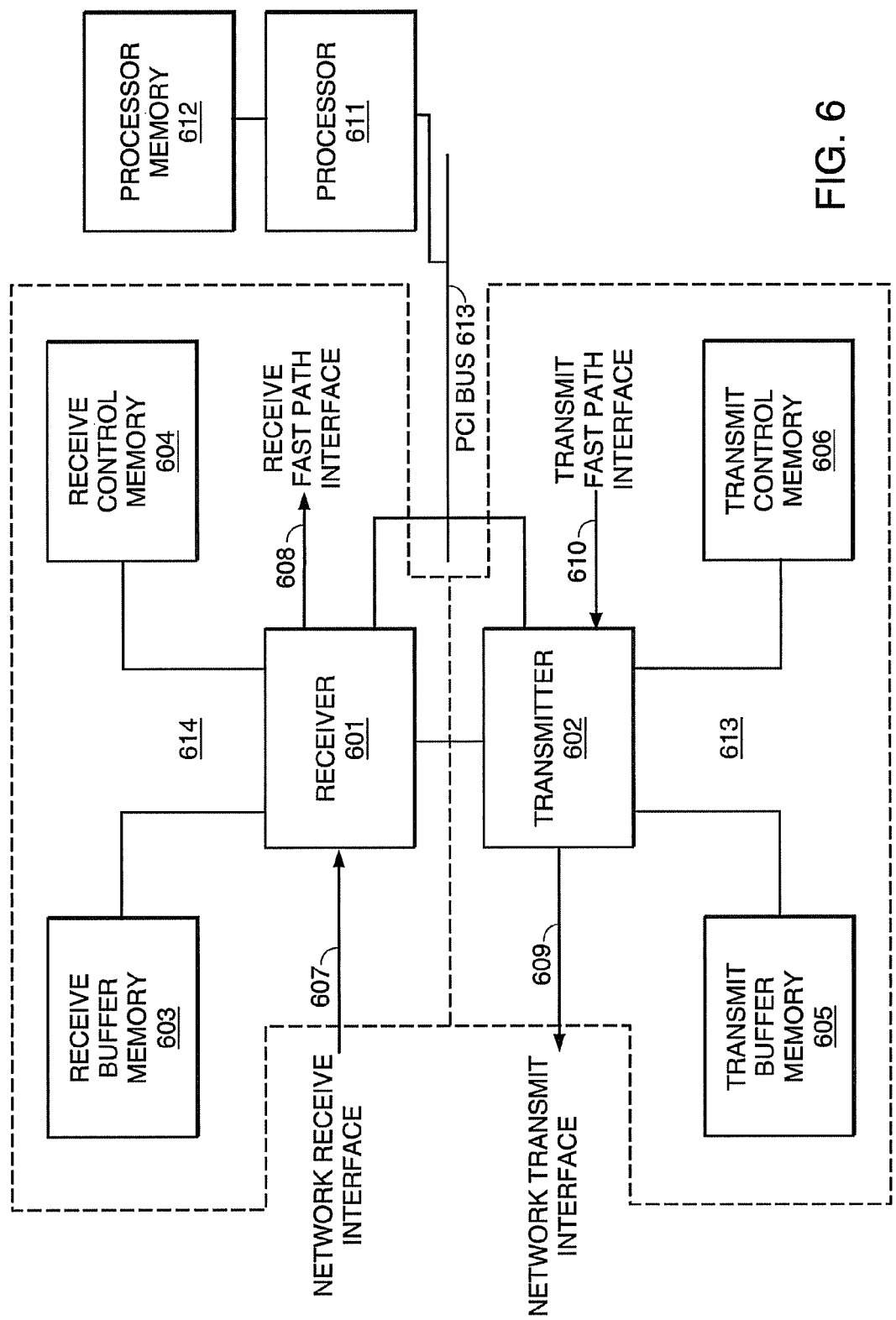
FIG. 6 is a block diagram of the network subsystem of FIG. 5.

FIG. 6 is a detailed block diagram of the network subsystem 51 of FIG. 5. The network subsystem of FIG. 6 includes a receiver module 614 (which includes a receiver 601, receive buffer memory 603, and receive control memory 604) and a transmitter module 613 (which includes transmitter 602, transmit buffer memory 605, and transmit control memory 606). The processor 611 is used by both the receiver module 614 and the transmitter module 613. The receiver 601 receives and interprets encapsulated data from the network receive interface 607. The receiver 601 de-encapsulates the data using control information contained in the receive control memory 604 and transmit control memory 606 and stores the de-encapsulated data in the receive buffer memory 603, from where it is either retrieved by the processor 611 via PCI bus 613 or output to the receive fast path interface 608. Memory 612 is used by processor 611 for storage of data and instructions.

The transmitter 602 accepts transmit requests from transmit fast path interface 610 or from the processor 611 via PCI bus 613. The transmitter 602 stores the data in transmit buffer memory 605. The transmitter 602 encapsulates the transmit data using control information contained in the transmit control memory 606 and transmits the encapsulated data over the network via the network transmit interface 609.

Figure 7:
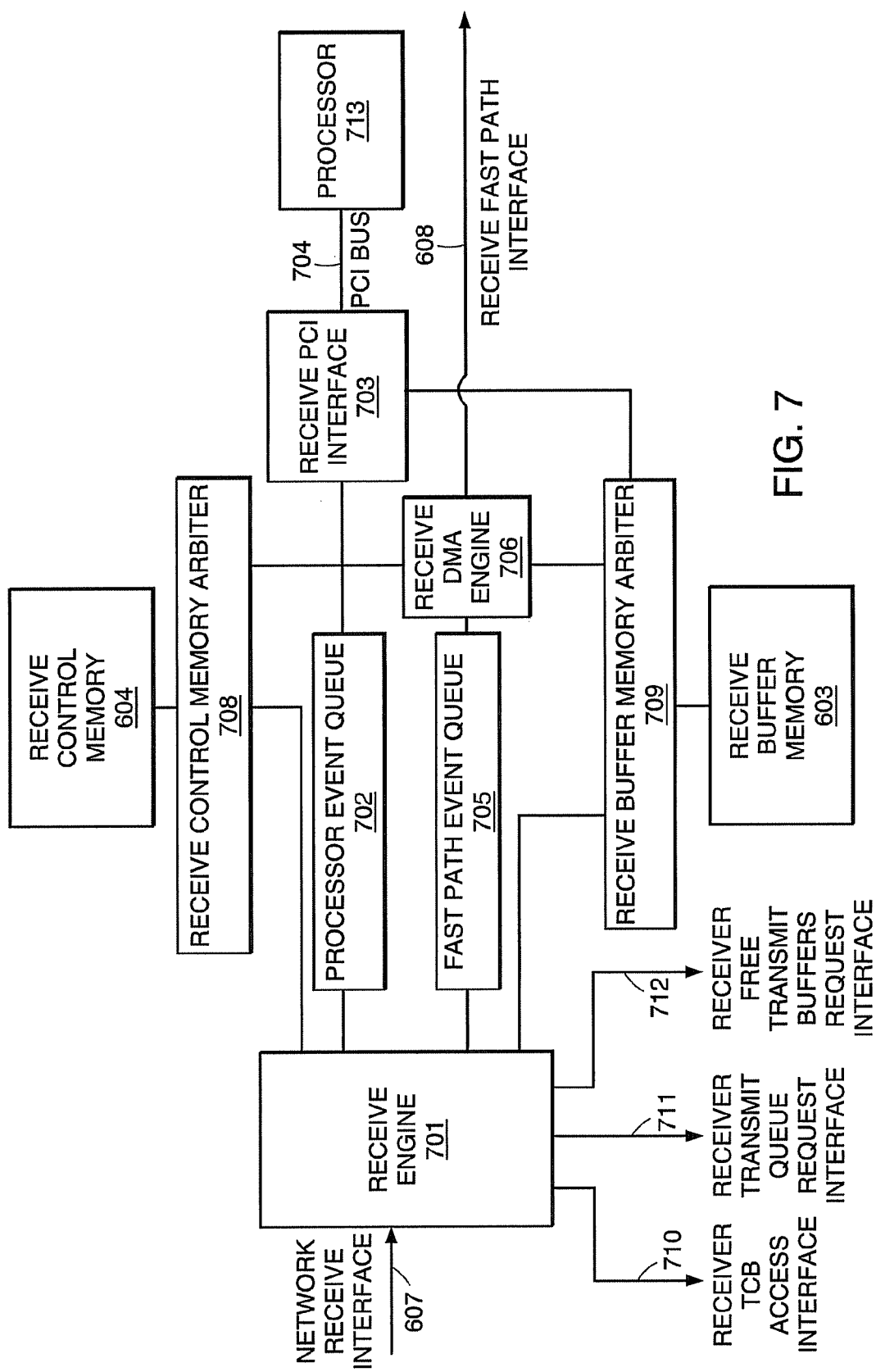
FIG. 7 is a block diagram of the receive module of the network subsystem of FIG. 6.

FIG. 7 is a block diagram of the receive module 614 of the network subsystem of FIG. 6. Packets are received by the receive engine 701 from the network receive interface 607. The receive engine 701 analyzes the packets and determines whether the packet contains an error, is a TCP/IP packet, or is not a TCP/IP packet. A packet is determined to be or not to be a TCP/IP packet by examination of the network protocol headers contained in the packet. If the packet contains an error then it is dropped.

If the packet is not a TCP/IP packet then the packet is stored in the receive buffer memory 603 via the receive buffer memory arbiter 709. An indication that a packet has been received is written into the processor event queue 702. The processor 713 can then retrieve the packet from the receive buffer memory 603 using the PCI bus 704 and the receive PCI interface block 703.

If the packet is a TCP/IP packet, then the receive engine 701 uses a hash table contained in the receive control memory 604 to attempt to resolve the network addresses and port numbers, contained within the protocol headers in the packet, into a number which uniquely identifies the connection to which this packet belongs, i.e., the connection identification. If this is a new connection identification, then the packet is stored in the receive buffer memory 603 via the receive buffer memory arbiter 709. An indication that a packet has been received is written into the processor event queue 702. The processor 713 can then retrieve the packet from the receive buffer memory 603 using the PCI bus 704 and the receive PCI interface block 703. The processor can then establish a new connection if required as specified in the TCP/IP protocol, or it can take other appropriate action.

If the connection identification already exists, then the receive engine 701 uses this connection identification as an index into a table of data which contains information about the state of each connection. This information is called the "TCP control block" ("TCB"). The TCB for each connection is stored in the transmit control memory 606. The receive engine 701 accesses the TCB for this connection via the receiver TCB access interface 710. It then processes this packet according to the TCP/IP protocol and adds the resulting bytes to the received byte stream for this connection in the receive buffer memory 603. If data on this connection is destined for the processor 713 then an indication that some bytes have been received is written into the processor event queue 702. The processor can then retrieve the bytes from the receive buffer memory 603 using the PCI bus 704 and the receive PCI interface block 703. If data on this connection is destined for the fast path interface 608, then an indication that some bytes have been received is written into the fast path event queue 705. The receive DMA engine 706 will then retrieve the bytes from the receive buffer memory 603 and output them to the fast path interface 608.

Some packets received by the receive engine 701 may be fragments of IP packets. If this is the case then the fragments are first reassembled in the receive buffer memory 603. When a complete IP packet has been reassembled, the normal packet processing is then applied as described above.

According to the TCP protocol, a connection can exist in a number of different states, including SYN_SENT, SYN_RECEIVED and ESTABLISHED. When a network node wishes to establish a connection to the network subsystem, it first transmits a TCP/IP packet with the SYN flag set. This packet is retrieved by the processor 713, since it will have a new connection identification. The processor 713 will then perform all required initialization including setting the connection state in the TCB for this connection to SYN_RECEIVED. The transition from SYN_RECEIVED to ESTABLISHED is performed by the receive engine 701 in accordance with the TCP/IP protocol. When the processor 713 wishes to establish a connection to a network node via the network subsystem, it first performs all required initialization including setting the connection state in the TCB for this connection to SYN_SENT. It then transmits a TCP/IP packet with the SYN flag set. The transition from SYN_SENT to ESTABLISHED is performed by the receive engine 701 in accordance with the TCP/IP protocol.

If a packet is received which has a SYN flag or FIN flag or RST flag set in the protocol header, and if this requires action by the processor 713, then the receive engine 701 will notify the processor of this event by writing an entry into the processor event queue 702. The processor 713 can then take the appropriate action as required by the TCP/IP protocol.

As a result of applying the TCP/IP protocol to the received packet it is possible that one or more packets should now be transmitted on this connection. For example, an acknowledgment of the received data may need to be transmitted, or the received packet may indicate an increased window size thus allowing more data to be transmitted on this connection if such data is available for transmission. The receive engine 701 achieves this by modifying the TCB accordingly and then requesting a transmit attempt by writing the connection identification into the transmit queue 802 in FIG. 8 via the receiver transmit queue request interface 711.

Received data is stored in discrete units (buffers) within the receive buffer memory 603. As soon as all the data within a buffer has been either retrieved by the processor 713 or outputted to the fast path interface 608 then the buffer can be freed, i.e., it can then be reused to store new data. A similar system operates for the transmit buffer memory 605, however, in the transmit case, the buffer can only be freed when all the data within it has been fully acknowledged, using the TCP/IP protocol, by the network node which is receiving the transmitting data. When the protocol header of the packet indicates that transmitted data has been acknowledged, then the receive engine 701 indicates this to the free transmit buffers block 805 in FIG. 8 via the receiver free transmit buffers request interface 712.

Additionally, it is possible for the receive engine 701 to process the upper layer protocol ("ULP") that runs on top of TCP/IP as well as TCP/IP itself. In this case, event queue entries are written into the processor event queue 702 and the fast path event queue 705 only when a complete ULP protocol data unit ("PDU") has been received; only complete ULP PDUs are received by the processor 713 and outputted to the fast path interface 608. An example of a ULP is NetBIOS. The enabling of ULP processing may be made on a per-connection basis; i.e., some connections may have ULP processing enabled, and others may not.

Figure 8:
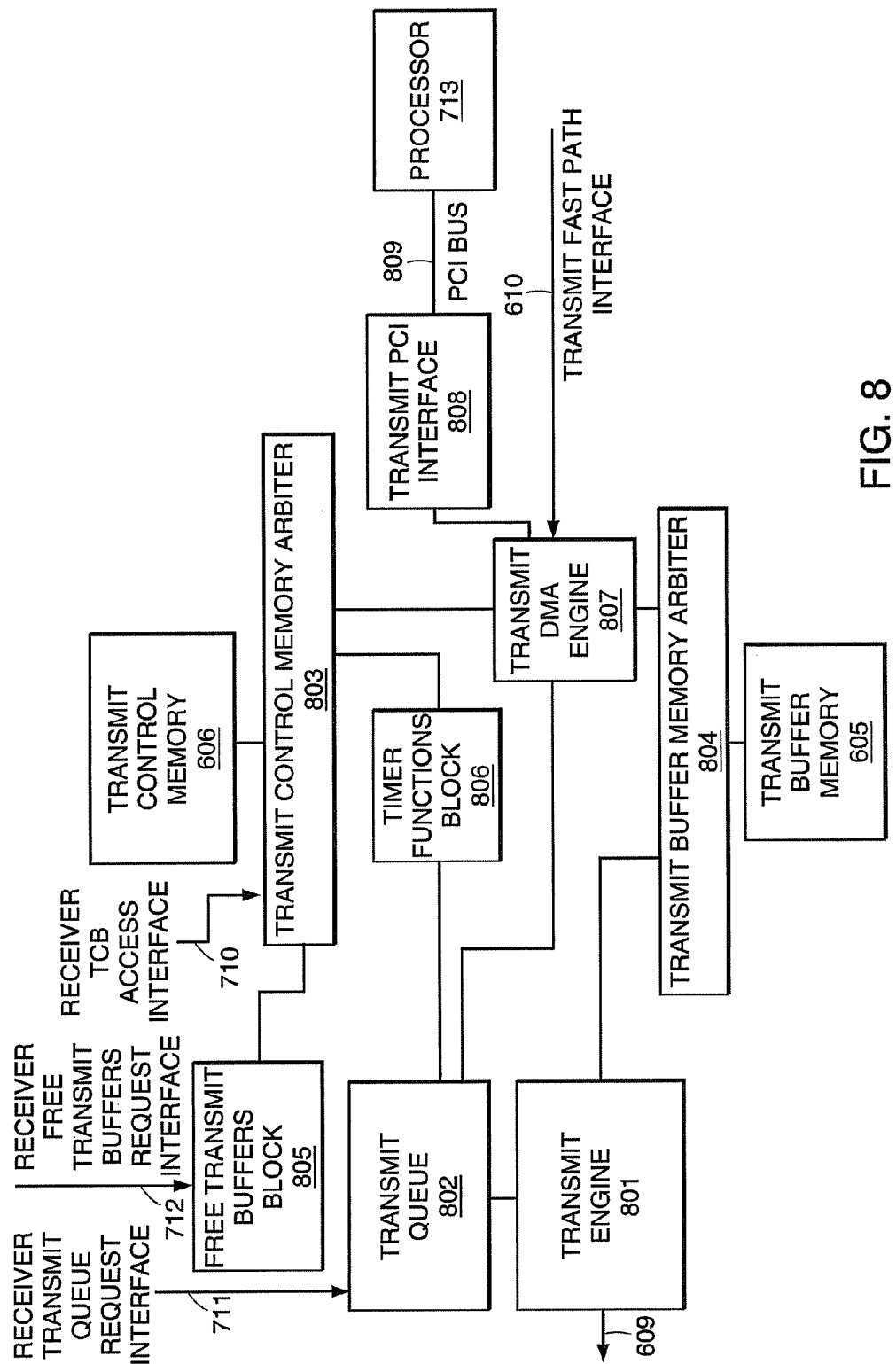
FIG. 8 is a block diagram of the transmit module of the network subsystem of FIG. 6.

FIG. 8 is a block diagram of the transmit module 613 of the network subsystem of FIG. 6. Data to be transmitted over the network using TCP/IP is inputted to the transmit DMA engine 807. This data is either input from the transmit fast path interface 610 or from the processor 713 via PCI bus 704 and the transmit PCI interface 808. In each case, the connection identification determining which TCP/IP connection should be used to transmit the data is also input. As mentioned above, each connection has an associated TCB that contains information about the state of the connection.

The transmit DMA engine stores the data in the transmit buffer memory 605, adding the inputted bytes to the stored byte stream for this connection. At the end of the input it modifies the TCB for the connection accordingly and it also writes the connection identification into the transmit queue 802.

The transmit queue 802 accepts transmit requests in the form of connection identifications from three sources: the received transmit queue request interface 711, the timer functions block 806, and the transmit DMA engine 807. As the requests are received they are placed in a queue. Whenever the queue is not empty, a transmit request for the connection identification at the front of the queue is passed to the transmit engine 801. When the transmit engine 801 has completed processing the transmit request this connection identification is removed from the front of the queue and the process repeats.

The transmit engine 801 accepts transmit requests from the transmit queue 802. For each request, the transmit engine 801 applies the TCP/IP protocol to the connection and transmit packets as required. In order to do this, the transmit engine 801 accesses the TCB for the connection in the transmit control memory 606, via the transmit control memory arbiter 803, and it retrieves the stored byte stream for the connection from the transmit buffer memory 605 via the transmit buffer memory arbiter 804.

The stored byte stream for a connection is stored in discrete units (buffers) within the transmit buffer memory 605. As mentioned above, each buffer can only be freed when all the data within it has been fully acknowledged, using the TCP/IP protocol, by the network node which is receiving the transmitting data. When the protocol header of the packet indicates that transmitted data has been acknowledged then the receive engine 701 indicates this to the free transmit buffers block 805 via the receiver free transmit buffers request interface 712. The free transmit buffers block 805 will then free all buffers which have been fully acknowledged and these buffers can then be reused to store new data.

TCP/IP has a number of timer functions which require certain operations to be performed at regular intervals if certain conditions are met. These functions are implemented by the timer functions block 806. At regular intervals the timer functions block 806 accesses the TCBs for each connection via the transmit control memory arbiter 803. If any operation needs to be performed for a particular connection, then the TCB for that connection is modified accordingly and the connection identification is written to the transmit queue 802.

Additionally it is possible for the transmit DMA engine 807 to process the upper layer protocol that runs on top of TCP/IP. In this case, only complete ULP protocol data units are inputted to the transmit DMA engine 807, either from the processor 713 or from the transmit fast path interface 610. The transmit DMA engine 807 then attaches the ULP header at the front of the PDU and adds the "pre-pended" ULP header and the inputted bytes to the stored byte stream for the connection. As discussed in connection with FIG. 7 above, an example of a ULP is NetBIOS. The enabling of ULP processing may be made on a per-connection basis; i.e., some connections may have ULP processing enabled, and others may not.

If the processor 713 wishes to transmit a raw packet, i.e., to transmit data without the hardware's automatic transmission of the data using TCP/IP, then when the processor 713 inputs the data to the transmit DMA engine 807 it uses a special connection identification. This special connection identification causes the transmit engine 801 to transmit raw packets, exactly as input to the transmit DMA engine 807 by the processor 713.

Figure 9:
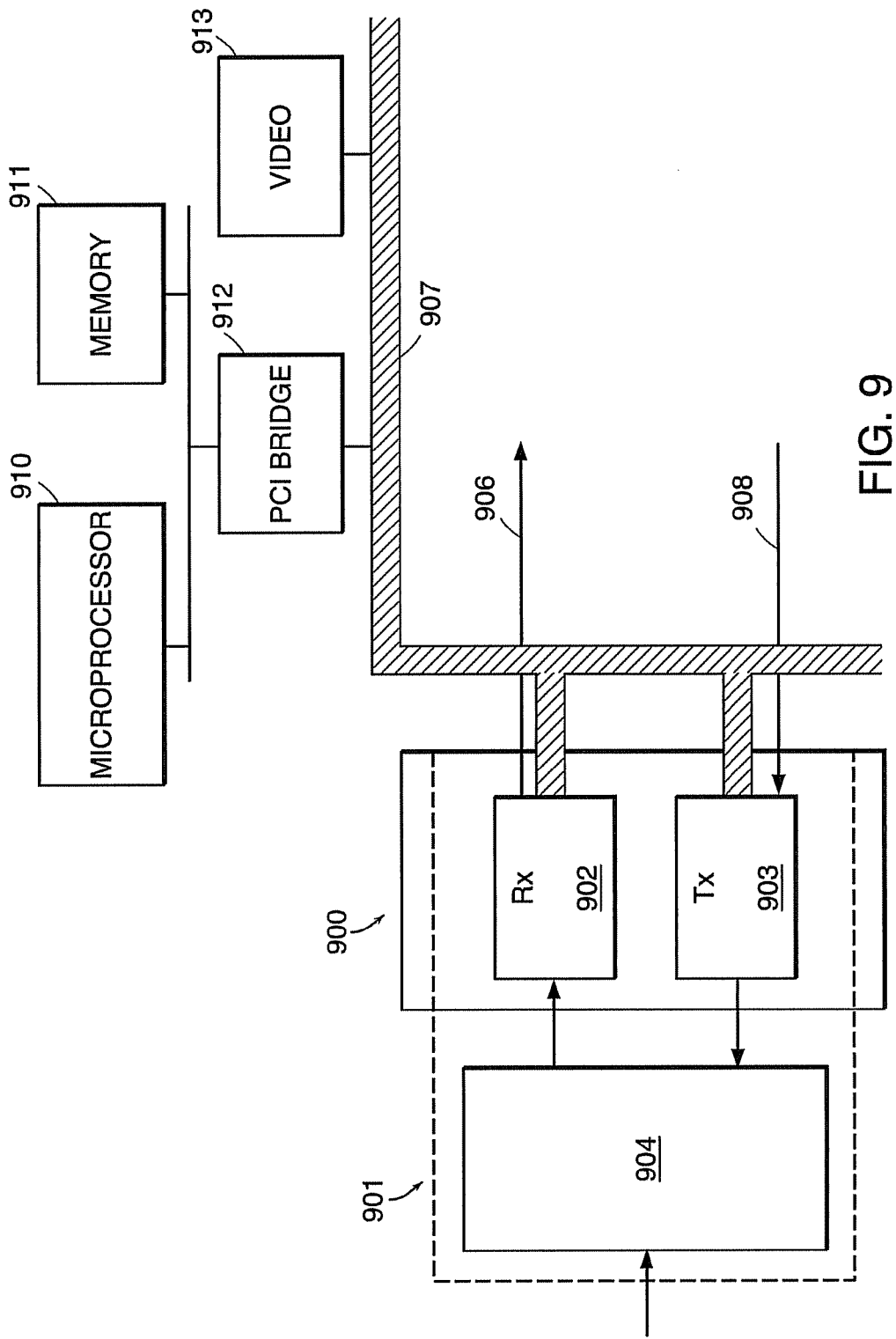
FIG. 9 is a block diagram illustrating use of the network subsystem of FIG. 5 as a network interface adapter for use with a network node, such as a workstation or server.

FIG. 9 is a block diagram illustrating use of the network subsystem of FIG. 5 as a network interface adapter for use with a network node, such as a workstation or server. In this embodiment, the network subsystem 901 is integrated into an adapter card 900 that is plugged into a computer. The adapter card 900 is coupled to the network via the network interface 904. The adapter card 900 is also coupled to the computer's microprocessor 910 via the PCI bus 907 and the PCI bridge 912. The PCI bus 907 may also be used by the computer to access peripheral devices such as video system 913. The receive module 902 and transmit module 903 operate in a manner similar to the receive module 614 and transmit module 613 of FIG. 6. Alternately or in addition, the adapter card 900 may be connected, via single protocol fast receive pipe 906 and single protocol fast transmit pipe 908, to a service module comparable to any of items 22, 32, 42, or 52 of FIG.

2, 3, 4, or 5 respectively, for providing rapid access to a storage arrangement by a remote node on the network or by the microprocessor 910.

Figure 10:
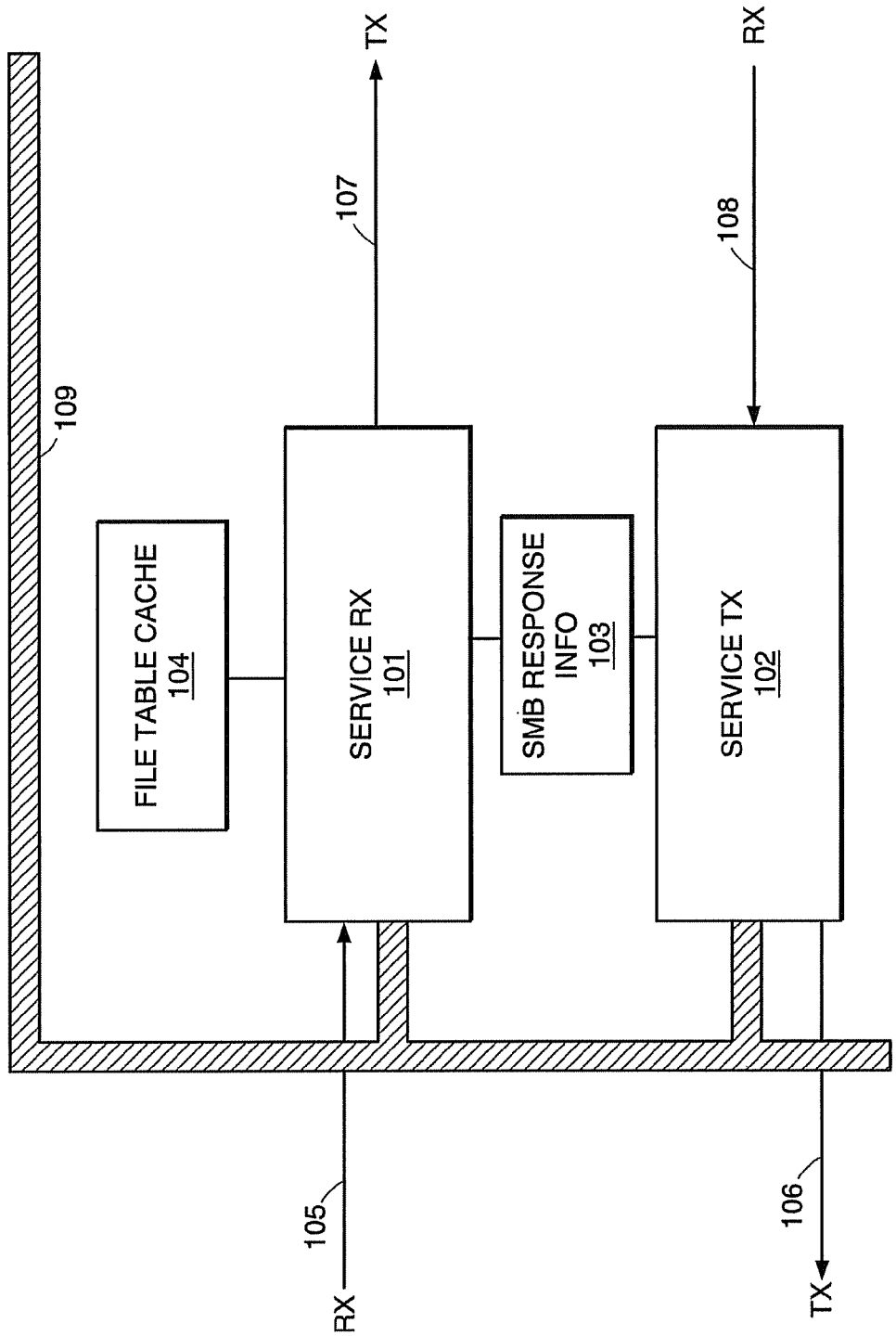
FIG. 10 is a block diagram of a hardware-implemented combination of the SMB service module 33 and file system module 34 of FIG. 3 for use in an embodiment such as illustrated in FIG. 3.

FIG. 10 is a block diagram of a hardware-implemented combination of the SMB service module 33 and file system module 34 of FIG. 3 for use in an embodiment such as illustrated in FIG. 3. In the embodiment of FIG. 10, SMB requests are received on the input 105 to the service receive block 101. Ultimately, processing by this embodiment results in transmission of a corresponding SMB response over the output 106. A part of this response includes a header. To produce the output header, the input header is stored in SMB response information memory 103. The block 101 processes the SMB request and generates a response. Depending on the nature of the request, the block 101 may access the file table cache 104 and issue a disk access request; otherwise the response will be relayed directly the transmit block 102. The service transmit block 102 transmits the response, generated by block 101, over the output 106. In the event that a disk access request has been issued by block 101, then upon receipt over line 108 of a disk response, the transmit block 102 issues the appropriate SMB response over line 106. Both the receive and transmit modules 101 and 102 are optionally in communication with the host system over PCI bus 109. Such communication, when provided, permits a host system to communicate directly with the embodiment instead of over a network, so as to give the host system rapid, hardware-implemented file system accesses, outside the purview of a traditional operating system.

Figure 11:
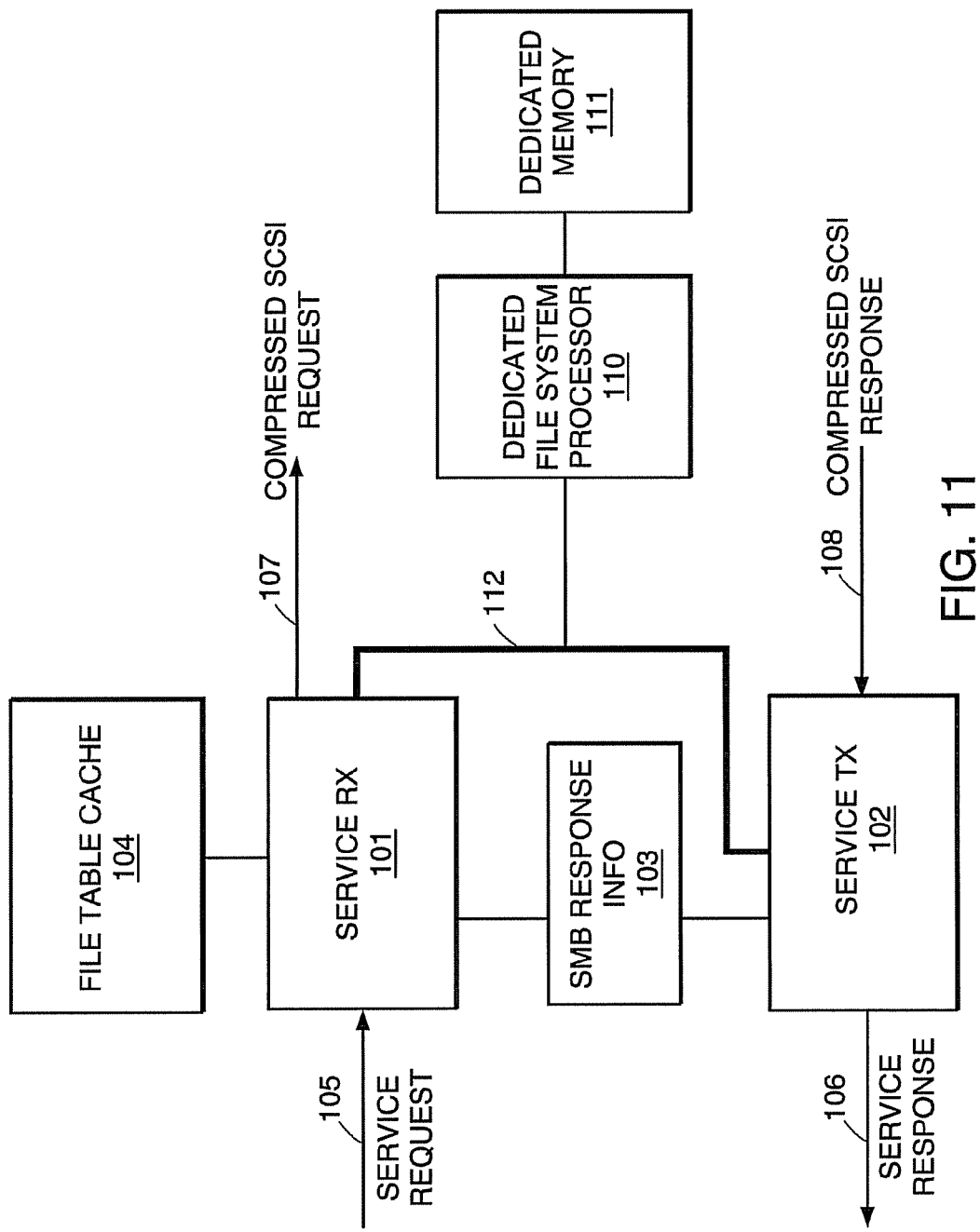
FIG. 11 is a block diagram of a hardware-accelerated combination of the SMB service module 33 and file system module 34 of FIG. 3 for use in an embodiment such as illustrated in FIG. 3.

FIG. 11 is a block diagram of a hardware-accelerated combination of the SMB service module 33 and file system module 34 of FIG. 3 for use in an embodiment such as illustrated in FIG. 3. The operation is analogous to that described above in connection with FIG. 10 with respect to similarly numbered blocks and lines 105, 107, 108, and 106. However, the dedicated file system processor 110, in cooperation with dedicated memory 111 operating over dedicated bus 112 control the processes of blocks 101 and 102. Additionally these items provide flexibility in handling of such processes, since they can be reconfigured in software.

Figure 12A:
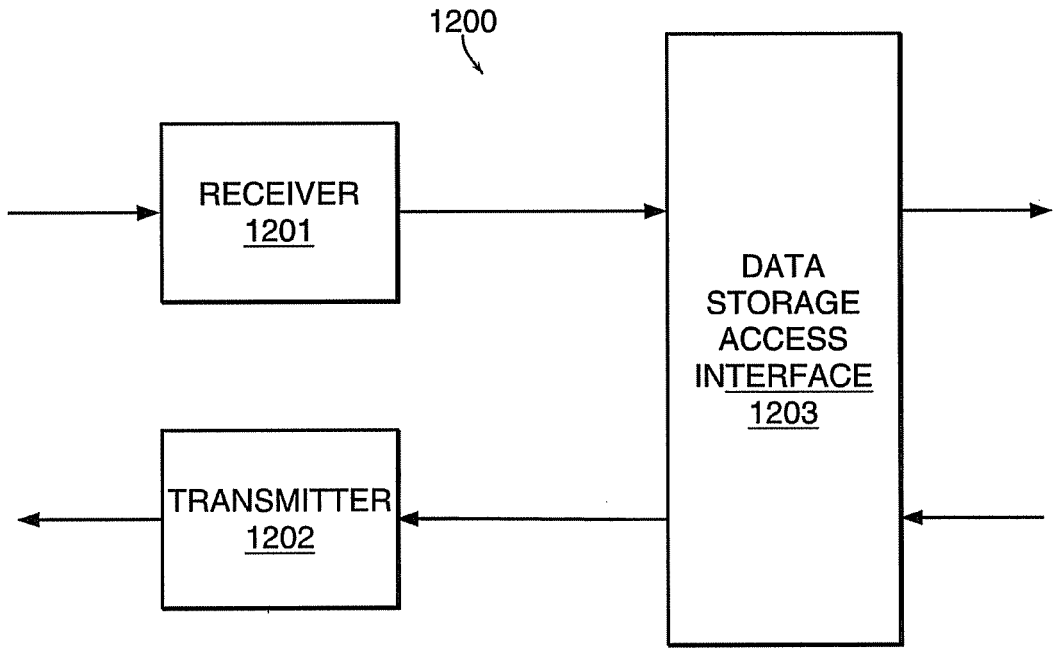
FIG. 12A is a block diagram of a hardware-implemented service module such as item 33 or 43 in FIG. 3 or FIG. 4 respectively.

FIG. 12A is a block diagram of a hardware-implemented service module such as item 33 or 43 in FIG. 3 or FIG. 4 respectively. The service module 1200 receives network service requests, fulfills such service requests, and may issue data storage access requests. The service module 1200 includes a receiver 1201 coupled to a transmitter 1202 and a data storage access interface 1203, which is also coupled to both the receiver 1201 and the transmitter 1202. The receiver 1201 receives and interprets network service requests. On receipt of a service request, the receiver 1201 either passes the request to the data storage access interface 1203 or passes information fulfilling the network service request to the transmitter 1202. If the request is passed to the data storage access interface 1203, the data storage access interface 1203 constructs and issues data storage access requests. The data storage access interface 1203 also receives replies to the data storage access requests and extracts information required to fulfill the original network service request. The information is then passed to the transmitter 1202. The transmitter 1202 processes information passed to it from the receiver 1201 or the data storage access interface 1203 and constructs and issues network service replies.

Figure 12B:
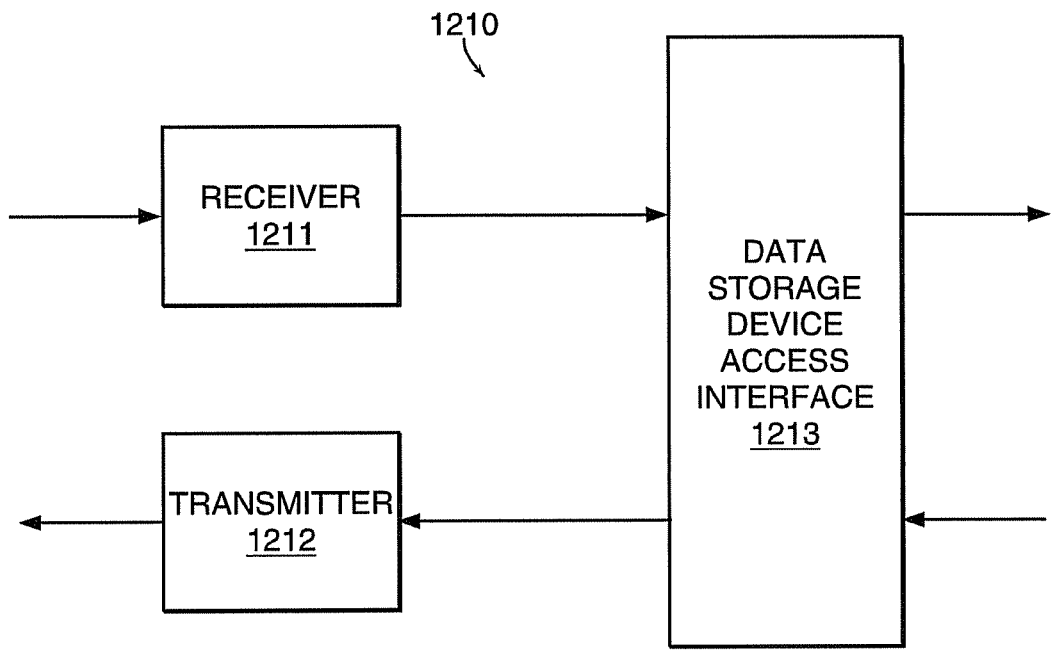
FIG. 12B is a block diagram of a hardware-implemented file module such as item 34 or 44 in FIG. 3 or FIG. 4 respectively.

FIG. 12B is a block diagram of a hardware-implemented file module such as item 34 or 44 in FIG. 3 or FIG. 4 respectively. The file system module 1210 receives data storage access requests, fulfills such data service access requests, and may issue storage device access requests. The file system module 1210 includes a receiver 1211 coupled to a transmitter 1212 and a data storage device access interface 1213 which is also coupled to both the receiver 1211 and the transmitter 1212. The receiver 1211 receives and interprets data storage access requests and either passes the request to the data storage device access interface 1213 or passes information fulfilling the data storage access request to the transmitter 1212. If the request is passed to the data storage device access interface 1213, the data storage device access interface 1213 constructs and issues data storage device access requests. The data storage device access interface 1213 also receives replies to the data storage device access requests and extracts information required to fulfill the original data storage access request. The information is then passed to the transmitter 1212. The transmitter 1212 processes information passed to it from the receiver 1211 or the data storage device access interface module 1213 and constructs and issues data storage access replies.

Figure 12C:
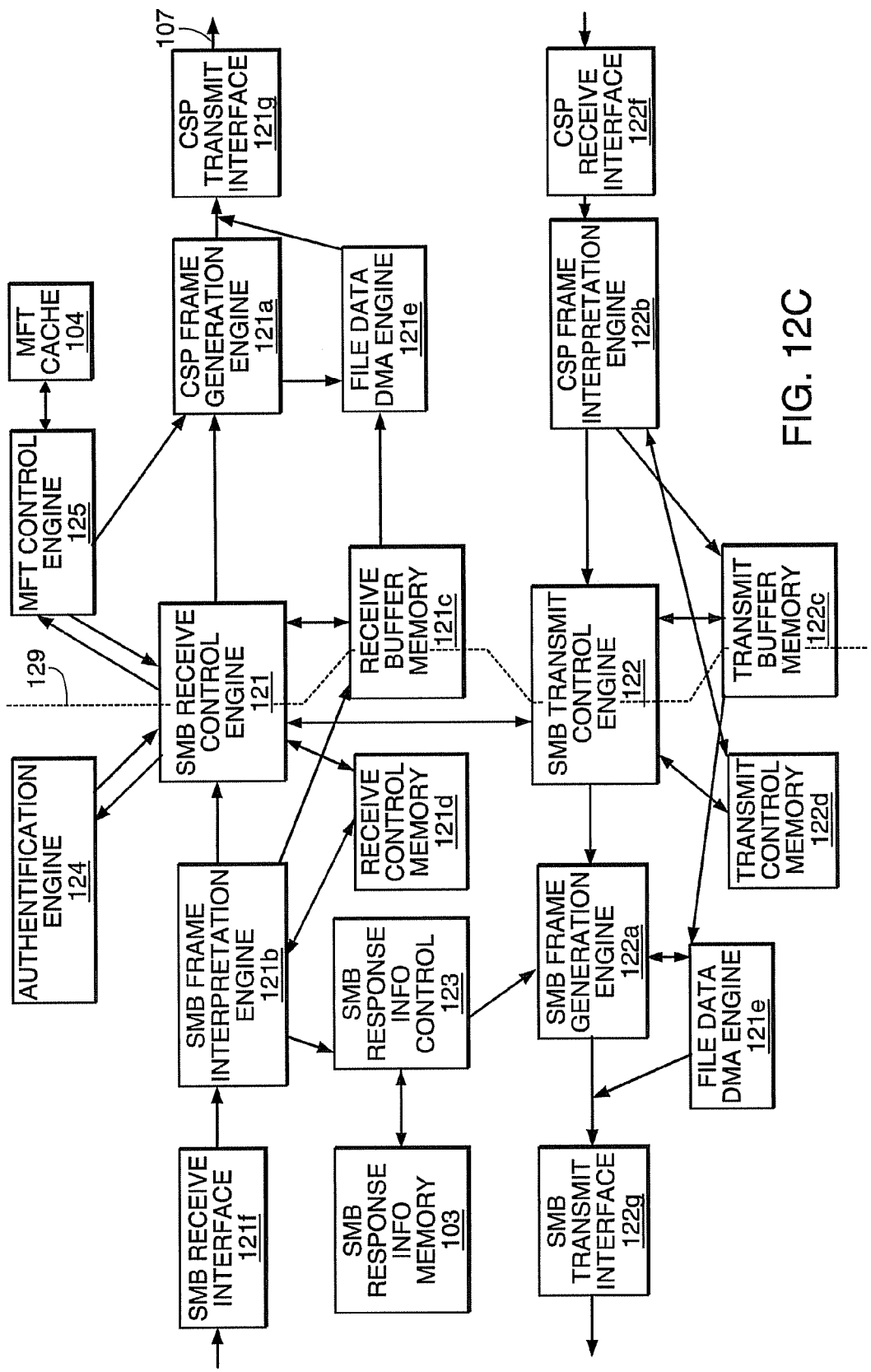
FIG. 12C is a detailed block diagram of the hardware-implemented service subsystem of FIG. 10, which provides a combined service module and file module.

FIG. 12C is a detailed block diagram of the hardware-implemented service subsystem of FIG. 10, which provides a combined service module and file module. Dashed line 129 in FIG. 12C shows the division between functions of this implementation. To the left of line 129 is the service module portion; to the right of line 129 is the file system module portion. (It will be understood, however, that the double-headed arrow connecting the SMB receive control engine 121 and the SMB transmit control engine 122 properly provides two-way communication between the engines 121 and 122 for each of the service module portion and the file system module portion.)

In FIG. 12C, SMB frames are received from the network subsystem via the network receive interface 121f and are passed to the SMB frame interpretation engine 121b. Here the frame is analyzed and a number of tasks are performed. The first section of the header is copied to the SMB response info control 123, which stores relevant information on a per connection basis in the SMB response info memory 103. The complete frame is written into buffers in the receive buffer memory 121c and the receive control memory 121d is updated. Relevant parts of the SMB frame header are passed to the SMB receive control engine 121.

The SMB receive control engine 121 of FIG. 12C parses the information from the header and, where appropriate, requests file access permission from the authentication engine 124. For SMB frames where a file access has been requested, the SMB receive control engine 121 extracts either file path information or the file identification from the SMB frame header and requests the MFT control engine 125 for the physical location of the required file data.

The MFT control engine 125 can queue requests from the SMB receive control engine 121 and similarly the SMB receive control engine 121 can queue responses from the MFT control engine 125. This allows the two engines to operate asynchronously from each other and thus allows incoming SMB frames to be processed while MFT requests are outstanding.

The MFT control engine 125 processes requests from the SMB receive control engine 121. Typically for SMB OPEN commands, a request will require a disk access to obtain the necessary physical file location information. Where this is necessary, the MFT control engine 125 passes a request to the compressed SCSI frame generation engine 121a that will generate the necessary compressed SCSI request. The compressed SCSI protocol ("CSP") relates to a data format from which a SCSI command may be generated in the manner described in connection with FIG. 17A and other figures below. Because compressed SCSI data is not derived from SCSI but are rather the source from which SCSI data may be derived, we sometimes refer to compressed SCSI data as "proto-SCSI" data. The relevant proto-SCSI response will be passed back to the MFT control engine 125, where it will be processed, the MFT cache 104 will be updated, and the physical file information will be passed back to the SMB receive control engine 121. Typically, for a SMB READ or WRITE command with respect to a recently accessed small file, the file information will be present in the MFT cache 104. Thus no disk access will be required.

When the SMB receive control engine 121 has received the response from an MFT request and a disk access for file data is required, as would be necessary for typical READ or WRITE commands, one or more proto-SCSI requests are passed to the proto-SCSI frame generation engine 121*a*. The proto-SCSI frame generation engine 121*a* will construct the proto-SCSI headers and, where necessary, for example, for WRITE commands, program the file data DMA engine 121*e* to pull the file data out of the receive buffer memory 121*c*. The proto-SCSI frame is then passed to the proto-SCSI module via proto-SCSI transmit interface 121*g*. Where no disk access is required, an SMB response request is passed directly to the SMB transmit control engine 122.

Proto-SCSI frames are received from the proto-SCSI module and via proto-SCSI receive interface 122*f* are passed to the proto-SCSI frame interpretation engine 122*b*. Here the frame is analyzed and a number of tasks are performed. MFT responses are passed back to the MFT control engine 125. All other frames are written into buffers in the receive buffer memory 121*c* and the receive control memory 121*d* is updated. Relevant parts of the proto-SCSI frame header are passed to the SMB transmit control engine 122.

Each SMB connection has previously been assigned a unique identification. All proto-SCSI frames include this identification and the SMB transmit control engine 122 uses this unique identification to request state information from the SMB receive control engine 121 and update this where necessary. When all necessary information for an SMB response has been received from the proto-SCSI module, the SMB transmit control engine 122 passes a request to the SMB frame generation engine 122*a*. The SMB frame generation engine 122*a* constructs the SMB response frame from data contained in the SMB response info memory 103 and file data stored in the SMB transmit buffer memory 122*c*. It then passes the frame to the SMB transmit interface 106 which in turn forwards it to the network subsystem.

Figure 13:
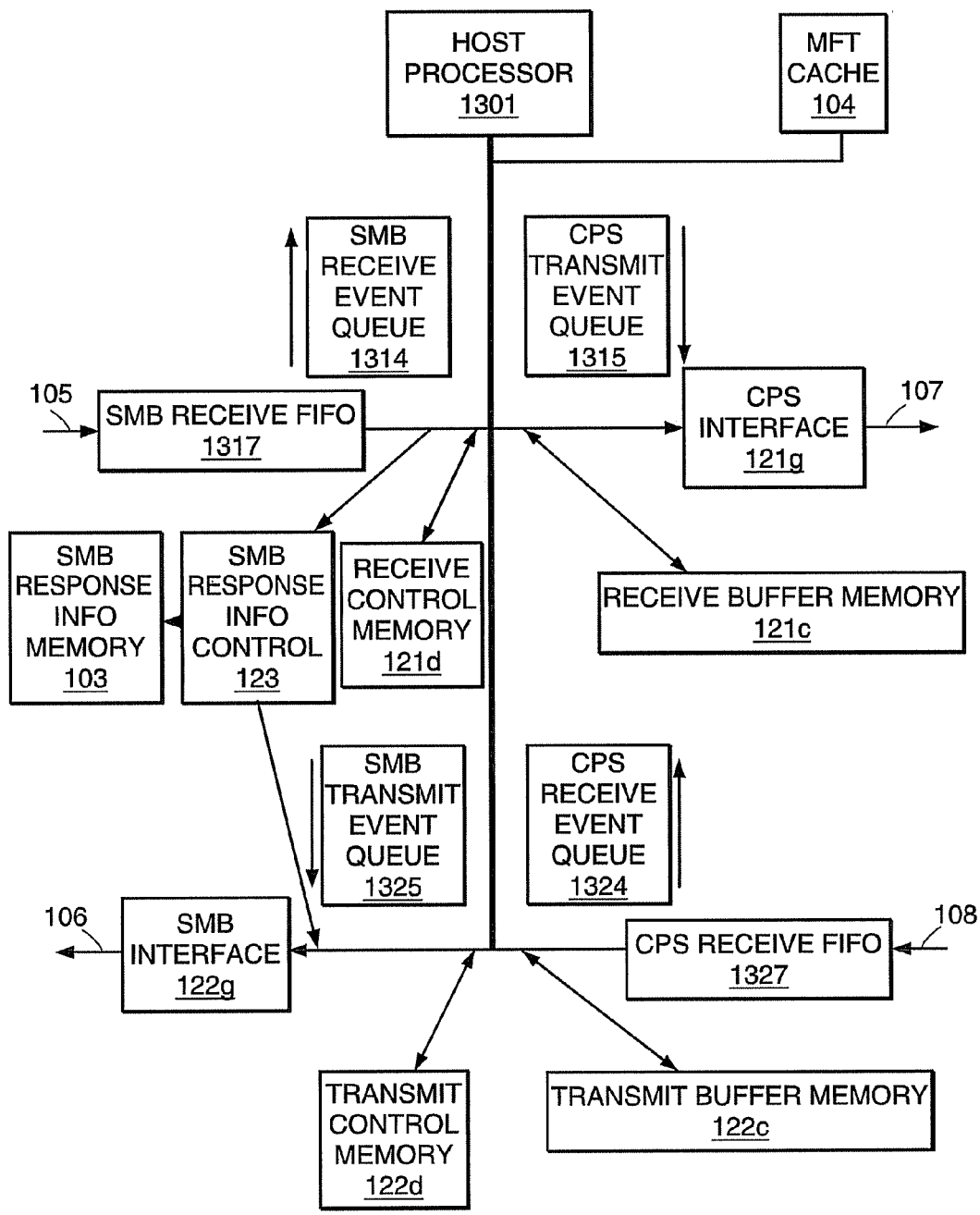
FIG. 13 is a detailed block diagram of the hardware-accelerated service subsystem of FIG. 11.

FIG. 13 is a detailed block diagram of the hardware-accelerated service subsystem of FIG. 11. Incoming SMB frames from the IP block are provided over input 105 are written, via the SMB receive FIFO 1317, into free buffers in the SMB receive buffer memory 121*c*. The SMB receive buffer memory 121*c* includes, in one embodiment, a series of receive buffers that are 2 Kb long and thus one SMB frame may straddle a number of receive buffers. As frames are written into SMB receive buffer memory 121*c*, SMB receive buffer descriptors are updated in the SMB receive control memory 121*d*. A 32-bit connection identification and a 32-bit frame byte count are passed to the SMB block from the IP block at the start of the frame. These two fields are written to the first two locations of the receive buffer in receive buffer memory 121*c*.

While the frame is being stored, the SMB header is also written to the SMB response info memory 103 for later use by the SMB transmit process. The unique connection identification passed to the SMB block by the IP block is used as a pointer to the appropriate info field in the SMB response info memory 103. This memory is arranged as blocks of 16 words, one block for each unique connection identification. With a 128 Mb SDRAM fitted, this allows 2M connections. At present just the first 32 bytes of the SMB frame are written to each info field.

When a complete frame has been written to the receive buffer memory 121*c*, an SMB buffer locator is written to the SMB receive event queue 1314 and an interrupt to the host processor 1301 is generated. The SMB buffer locator contains information pertaining to the SMB frame including a buffer pointer and a "last" bit. The buffer pointer points to the buffer in receive buffer memory 121*c* that contains the start of the SMB frame. The "last" bit indicates whether this buffer also contains the end of the SMB frame (i.e., whether the SMB frame is less than 2 Kb in length).

The host processor 1301 can read the SMB buffer locator in the SMB receive event queue 1314 by reading an appropriate SMB receive event register associated with the event queue 1314. By using the buffer pointer read from the SMB buffer locator, the host processor 1301 can determine the address of the first buffer of the SMB frame in the receive buffer memory 121*c* and can thus read the SMB header and the first part of the frame.

If the SMB frame is longer than 2 Kb and it is necessary to read more than the first 2 Kb of the SMB frame, then the receive buffer descriptor associated with this receive buffer should be read from the receive control memory 121*d*. This receive buffer descriptor will contain a pointer to the next buffer of the SMB frame. This next buffer will similarly have a receive buffer descriptor associated with it unless the previous buffer's descriptor contained a "last" bit indicating that the receive buffer it pointed to contained the end of the SMB frame.

After reading the received SMB frame, if none of the data contained within the frame is to be used further, then the buffers of the received frame are made available for use again by writing pointers to them to the receive free buffers queue, which is contained in the receive buffer control memory 121*d*, by writing to an associated receive return free buffers register.

To transmit a proto-SCSI frame the host processor 1301 firstly obtains a pointer to a free SMB receive buffer by reading from the receive fetch free buffer register. This action will pull a pointer to a free buffer from the free buffers queue contained in the receive control memory 121*d*. In this buffer the start of the proto-SCSI request frame can be constructed. To request the proto-SCSI transmit entity to transfer the proto-SCSI frame to the proto-SCSI entity, the host processor 1301 writes a buffer locator and buffer offset pair to the proto-SCSI transmit event queue 1315 by writing them to the receive proto-SCSI event register associated with the proto-SCSI transmit event queue 1315.

The buffer locator contains a pointer to the buffer containing data for the proto-SCSI frame. The buffer offset contains an offset to the start of the data within the buffer and a length field. The buffer locator also contains a "last" bit to indicate whether further buffer locator/buffer offset pairs will be written to the proto-SCSI transmit event queue 1315 containing pointers to more data for this proto-SCSI frame.

If the proto-SCSI frame is to include data from another SMB receive buffer, as would be typical for a SMB WRITE command, then the host processor 1301 must write another buffer locator/buffer offset pair describing this SMB receive buffer to the proto-SCSI transmit event queue 1315. If the data to be included in the proto-SCSI frame straddles more than one SMB receive buffer, then the proto-SCSI transmit entity can use the buffer pointers in the associated SMB receive buffer descriptor located in receive control memory 121*d* to link the data together. If the extra data is from a SMB receive frame, then these descriptors will have been filled in previously by the SMB receive entity.

Because data from SMB receive buffers may be used for more than one proto-SCSI frame, then freeing up the SMB receive buffers after they have been used is not a simple process. SMB receive buffers containing sections of a received SMB frame that are not involved in the proto-SCSI transmit can be freed by writing them back to the free buffers queue contained in the receive control memory via the associated receive return free buffer register. SMB receive buffers that contain data to be included in proto-SCSI frames can not be freed in the same way because they can not be freed until the data within them has been transmitted. Consequently, after the buffer locator/buffer offset pairs to the various proto-SCSI frames which will contain the SMB data have been written to the proto-SCSI transmit event queue 1315, pointers to the original SMB receive buffers are also written to the proto-SCSI transmit event queue 1315. These pointers are marked to indicate that they are to be freed back to the free buffers queue contained in the receive control memory 121*d*. As data in the proto-SCSI transmit event queue 1315 is handled in sequence, the SMB receive buffers will only be freed after any data within them has been transmitted.

Incoming proto-SCSI frames from the IP block are written, via the proto-SCSI receive FIFO 1327, into free buffers in the SMB transmit buffer memory 122*c*. The SMB transmit buffers are 2 Kb long and thus one proto-SCSI frame may straddle a number of transmit buffers. As frames are written into SMB transmit buffer memory 122*c*, SMB transmit buffer descriptors are updated in the SMB transmit control memory 122*d*. When a complete frame has been written to the SMB transmit buffer memory 122*c*, an SMB buffer locator is written to the proto-SCSI receive event queue 1324 and an interrupt to the host processor 1301 is generated. The SMB buffer locator contains information pertaining to the proto-SCSI frame, including a buffer pointer and a "last" bit. The buffer pointer points to the buffer in transmit buffer memory 122*c* that contains the start of the proto-SCSI frame. The "last" bit indicates whether this buffer also contains the end of the proto-SCSI frame (i.e., whether the frame is less than 2 Kb in length).

The host processor 1301 can read the buffer locator in the proto-SCSI receive event queue 1324 by reading an appropriate proto-SCSI receive event register associated with the event queue 1324. Using the buffer pointer read from the buffer locator, the host processor 1301 can determine the address of the first buffer of the proto-SCSI frame in the transmit buffer memory 122*c* and can thus read the header and the first part of the frame.

If the proto-SCSI frame is longer than 2 Kb, and it is necessary to read more than the first 2 Kb of the frame, the transmit descriptor associated with this transmit buffer should be read from the receive control memory 121*d*. The descriptor will contain a pointer to the next buffer of the proto-SCSI frame. This next buffer will similarly have a transmit descriptor associated with it unless the previous buffer's descriptor contained a "last" bit indicating that the buffer it pointed to contained the end of the proto-SCSI frame. After reading the received proto-SCSI frame, if none of the data contained within the frame is to be used further, then the buffers of the received frame should be returned to the transmit free buffers queue contained in the transmit control memory 122*d* by writing to the transmit return free buffers register associated with it.

To transmit an SMB frame, the host processor first obtains a pointer to a free SMB transmit buffer in transmit buffer memory 122*c* from the transmit free buffer queue contained in the transmit control memory 122*d* by reading from an associated register. In this buffer, the start of the SMB response frame can be constructed. The 32-bit connection identification and a 32-bit SMB transmit control field are placed before the SMB frame in the buffer. The SMB transmit control field includes a 24-bit frame byte count and a pre-pend header bit. If the pre-pend header bit is set, then after the connection identification and SMB transmit control field have been passed to the IP block, then the SMB header stored in the response info memory 103 will be automatically inserted.

To request the SMB transmit entity to transfer the SMB frame to the SMB entity, the host processor 1301 writes a buffer locator and buffer offset pair to the SMB transmit event queue 1325 by writing them to an associated transmit SMB transmit event register. The buffer locator contains a pointer to the buffer containing data for the SMB frame. The buffer offset contains an offset to the start of the data within the buffer and a length field. The buffer locator also contains a "last" bit to indicate whether further buffer locator/buffer offset pairs will be written containing pointers to more data for this SMB frame.

If the SMB frame is to include data from another SMB transmit buffer in buffer memory 122*c*, then the host processor 1301 must write another buffer locator/buffer offset pair describing this SMB transmit buffer to the SMB transmit event queue 1325. If the data to be included in the SMB frame straddles more than one SMB transmit buffer, then the SMB transmit entity can use the buffer pointers in the associated transmit buffer descriptor to link the data together. If the extra data is from a proto-SCSI receive frame, then these descriptors will have been filled in previously by the proto-SCSI receive entity.

Because data from SMB transmit buffers in transmit buffer memory 122*c* may be used for more than one SMB frame, then freeing up the SMB transmit buffers after they have been used is not a simple process. SMB transmit buffers that contain sections of a received proto-SCSI frame that are not involved in the SMB transmit can be freed by writing them back to the transmit free buffers queue contained in the transmit control memory via the associated transmit return free buffers register. SMB transmit buffers that contain data to be included in SMB frames cannot be freed in the same way, because these buffers cannot be freed until the data within them has been transmitted.

Consequently, after the buffer locator/buffer offset pairs to the various SMB frames which will contain the proto-SCSI data have been written to the SMB transmit event queue 1325, pointers to the original SMB transmit buffers are also written to the SMB transmit event queue 1325. These pointers are marked to indicate that they are to be freed back to the transmit free buffers queue. As the SMB transmit event queue 1325 is handled in sequence, then the SMB transmit buffers will only be freed after any data within them has been transmitted.

Figure 14:
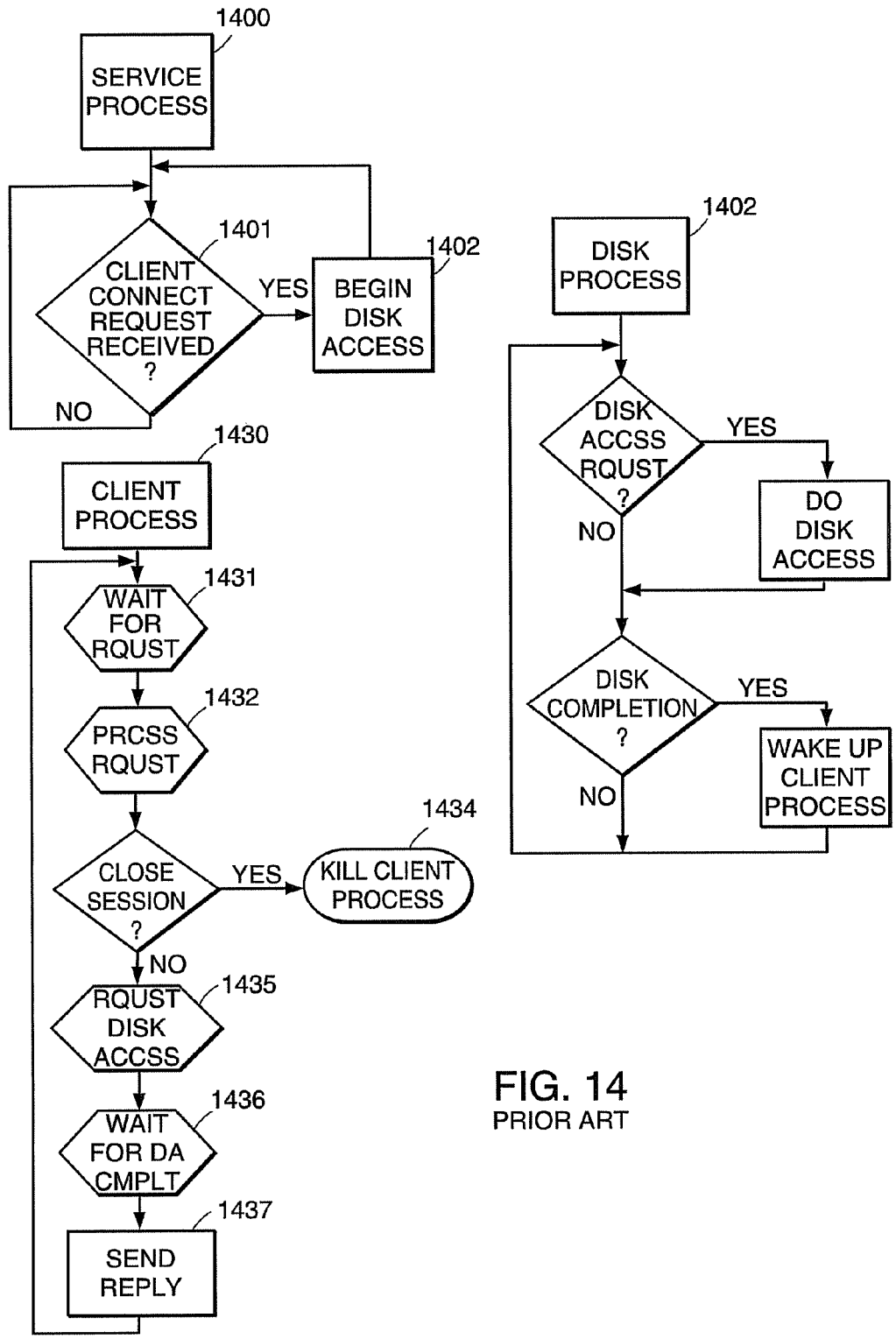
FIG. 14 is a flow chart representing a typical prior art approach, implemented in software, for handling multiple service requests as multiple threads.

FIG. 14 is a flow chart representing a typical prior art approach, implemented in software, for handling multiple service requests as multiple threads. In a traditional multiple-threaded architecture there is typically at least one thread to service each client. Threads are started and ended as clients attach and detach from the server. Each client may have a thread on the server to handle service requests and a thread to handle disk requests. The service process 1400 includes a repeated loop in which there is testing for the presence of a client connection request in box 1401; if the test is in the affirmative, the process initiates, in box 1402, the client process 1430. When the client process 1430 requires disk access, as in box 1435, it first requests the appropriate disk process to access the disk and then sleeps, in box 1436, until the disk access completes. The disk process 1402 then wakes up the client process 1430 to allow it to send the reply, in box 1437, to the client issuing the service request. Thus, there are at least two process switches for each client request requiring disk access. Implementing these multiple threaded processes in hardware poses problems because normally, they are handled by a multi-tasking operating system.

Figure 15:
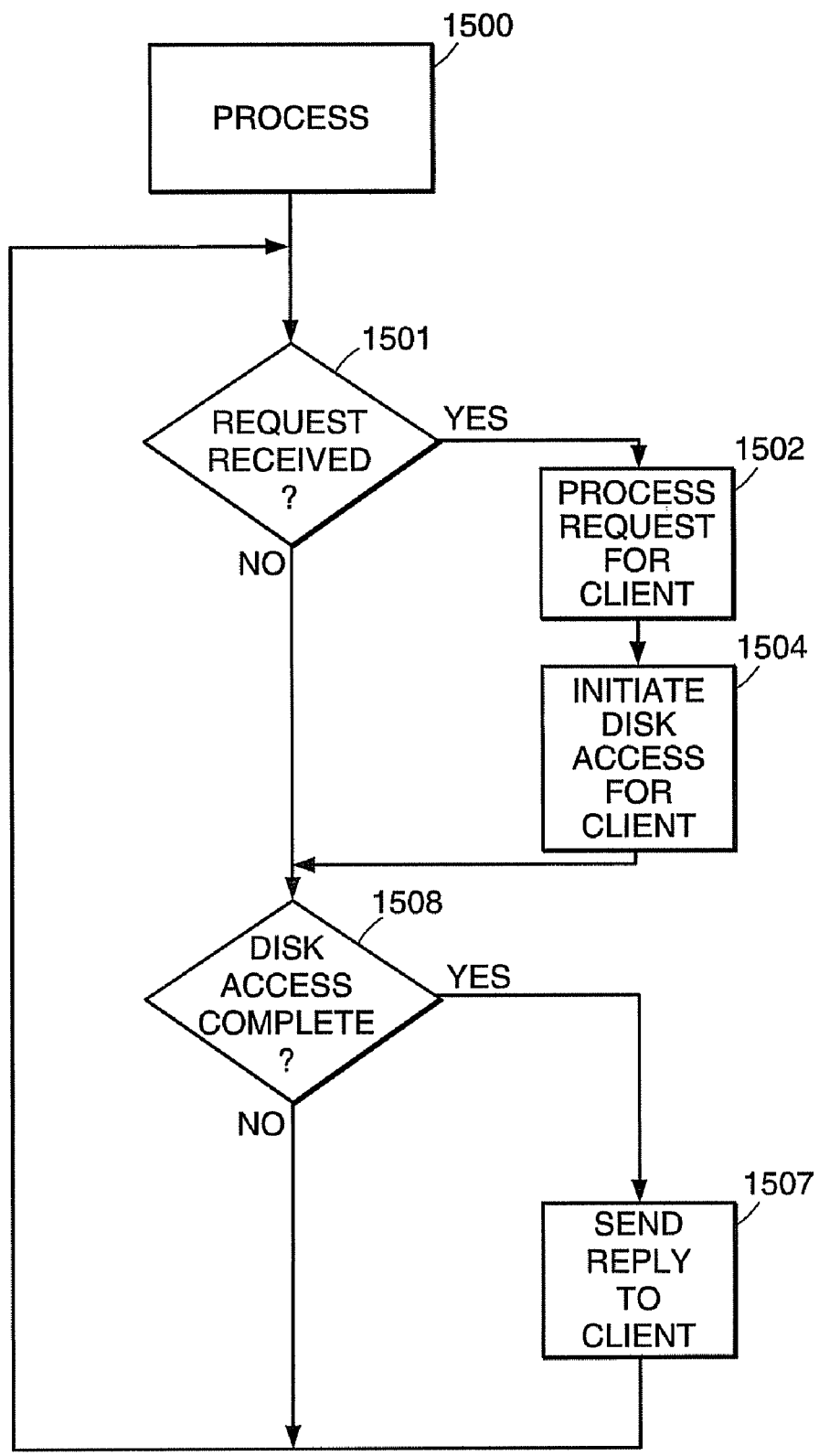
FIG. 15 is a flow chart showing the handling of multiple service requests, for use in connection with the service subsystem of FIG. 2 and, for example, the embodiments of FIGS. 12 and 13.

FIG. 15 is a flow chart showing the handling of multiple service requests in a single thread, for use in connection with the service subsystem of FIG. 2 and, for example, the embodiments of FIGS. 12 and 13. In the single-threaded architecture one service process 1500 handles requests from multiple clients in a single thread and one disk process 1502 handles all the requests from the service process 1500. The prior art approach of using a separate process for each client making a request has been eliminated and its function has been here handled by the single service process 1500. Additionally, these two processes, the service process and the disk process, may be contained within the same thread, as illustrated, or may be shared between two separate threads to facilitate load balancing.

The single-threaded service process of FIG. 15 can have disk requests from multiple clients outstanding simultaneously. The single thread includes a main loop with two tests. The first test, in box 1501, is whether a request has been received from a client. The second test, in box 1508, is whether a previously initiated disk access request has been completed. In consequence, as a disk access has been determined in box 1508 to have been completed, the service process in box 1507 will send the appropriate reply back to the client. Once the service process 1500 has handled a disk access request via box 1501 and has caused the request to be processed in box 1502, and caused, in box 1504, the initiation of a disk access, the service process is free to handle another request from another client via box 1501 without having to stop and wait for the previous disk access to complete. Upon a determination in box 1508 that the disk access has been completed, the disk process in box 1507 will inform the service process of the result, and the service process will send the response to the client. Thus the service and disk processes will be constantly running as long as there are requests being sent from clients.

FIG. 16 is a block diagram illustrating use of a file system module, such as illustrated in FIG. 3, in connection with a computer system having file storage. (An implementation analogous to that of FIG. 16 may be used to provide a storage module, such as illustrated in FIG. 3, in connection with a computer system having file storage.) In this embodiment, the file system module 1601 is integrated into a computer system, which includes microprocessor 1605, memory 1606, and a peripheral device, such as video 1609, as well as disk drive 1610, accessed via a disk subsystem 1602, which is here a conventional disk drive controller. The file system module 1601 is coupled to the disk subsystem 1602. The file system module 1601 is also coupled to the computer multiprocessor 1605 and the computer memory 1606 via the PCI bridge 1604 over the PCI bus 1607. The PCI bus 1607 also couples the microprocessor 1605 to the computer peripheral device 1609. The receive engine 1 of the file system module 1601 processes disk access requests from the microprocessor 1605 in a manner similar to that described above with respect to FIGS. 10, 11, 12B, and 13. Also the transmit engine if the file system module 1601 provides responses to disk access requests in a manner similar to that described above with respect to FIGS. 10, 11, 12B, and 13.

Figure 17A:
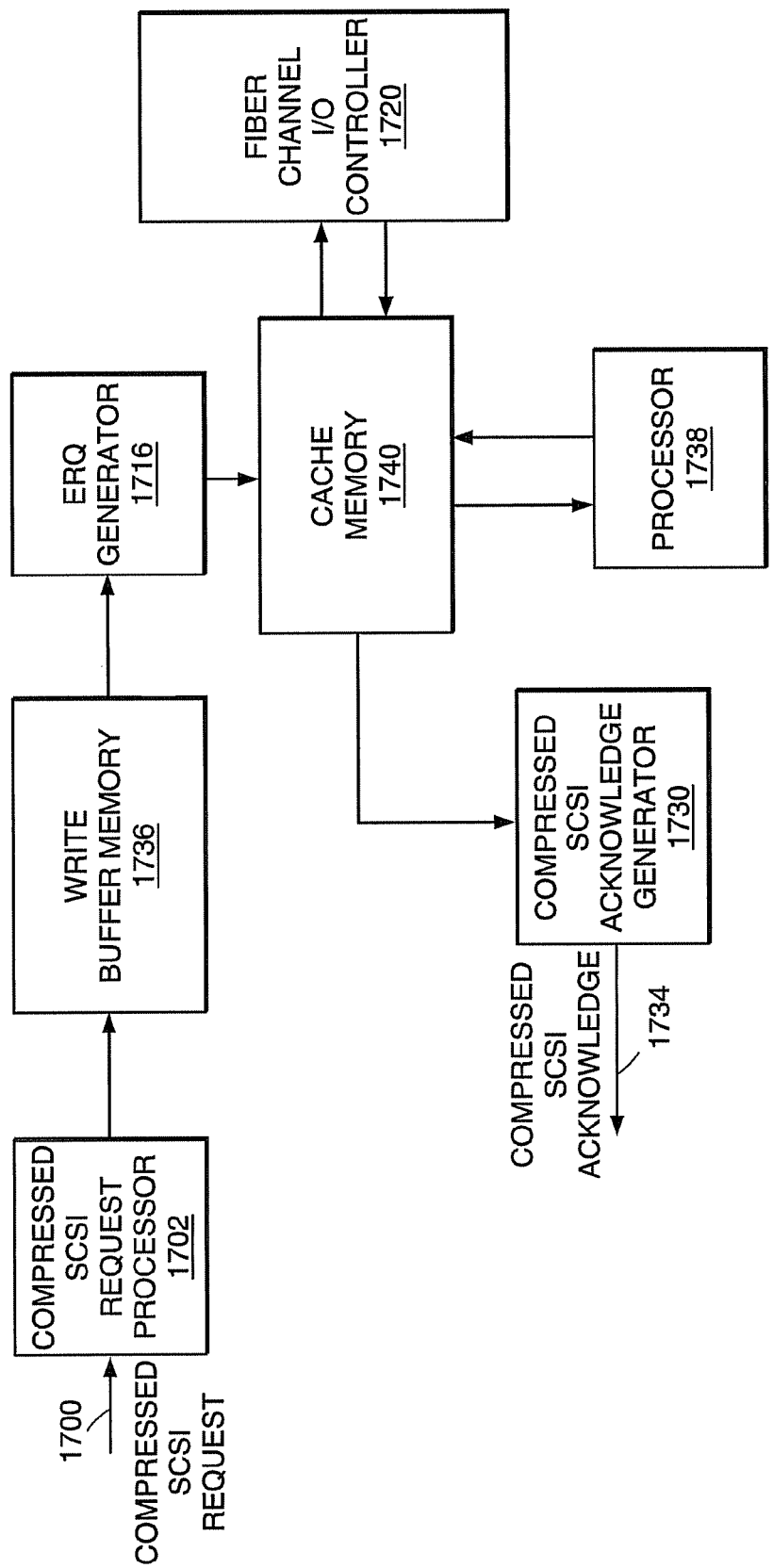
FIG. 17A is a block diagram of data flow in the storage module of FIG. 3.

FIG. 17A is a block diagram of data flow in the storage module of FIG. 3. It should be noted that while in FIGS. 17A and 17B a Tachyon XL fiber optic channel controller, available from Hewlett Packard Co., Palo Alto, Calif., has been used as the I/O device, embodiments of the present invention may equally use other I/O devices. Proto-SCSI requests are received over the proto-SCSI input 1700 by the proto-SCSI request processor 1702. The information relating to this request is stored in a SEST information table, and if the request is a WRITE request, then the WRITE data, which is also provided over the proto-SCSI input 1700, is stored in the WRITE buffer memory 1736.

The exchange request generator 1716 takes the information from the WRITE buffer memory 1736. If all the buffers to be written are currently cached, or the data to be written completely fill the buffers to be written, then the WRITE can be performed immediately. The data to be written is copied from WRITE buffer memory 1736 to the appropriate areas in the cache memory 1740. The Fiber Channel I/O controller 1720 is then configured to write the data to the appropriate region of disk storage that is in communication with the controller 1720. Otherwise a READ from the disk must be done before the WRITE to obtain the required data from the appropriate disk.

The proto-SCSI acknowledge generator 1730 is responsible for generating the proto-SCSI responses. There are three possible sources which can generate proto-SCSI responses, each of which supplies a SEST index: the processor 1738, Fiber Channel I/O controller 1720, and the cache memory 1740. For all transfers, an identification that allows the proto-SCSI request to be tied up with the acknowledge, along with status information, are returned the proto-SCSI acknowledge interface 1734.

Figure 17B:
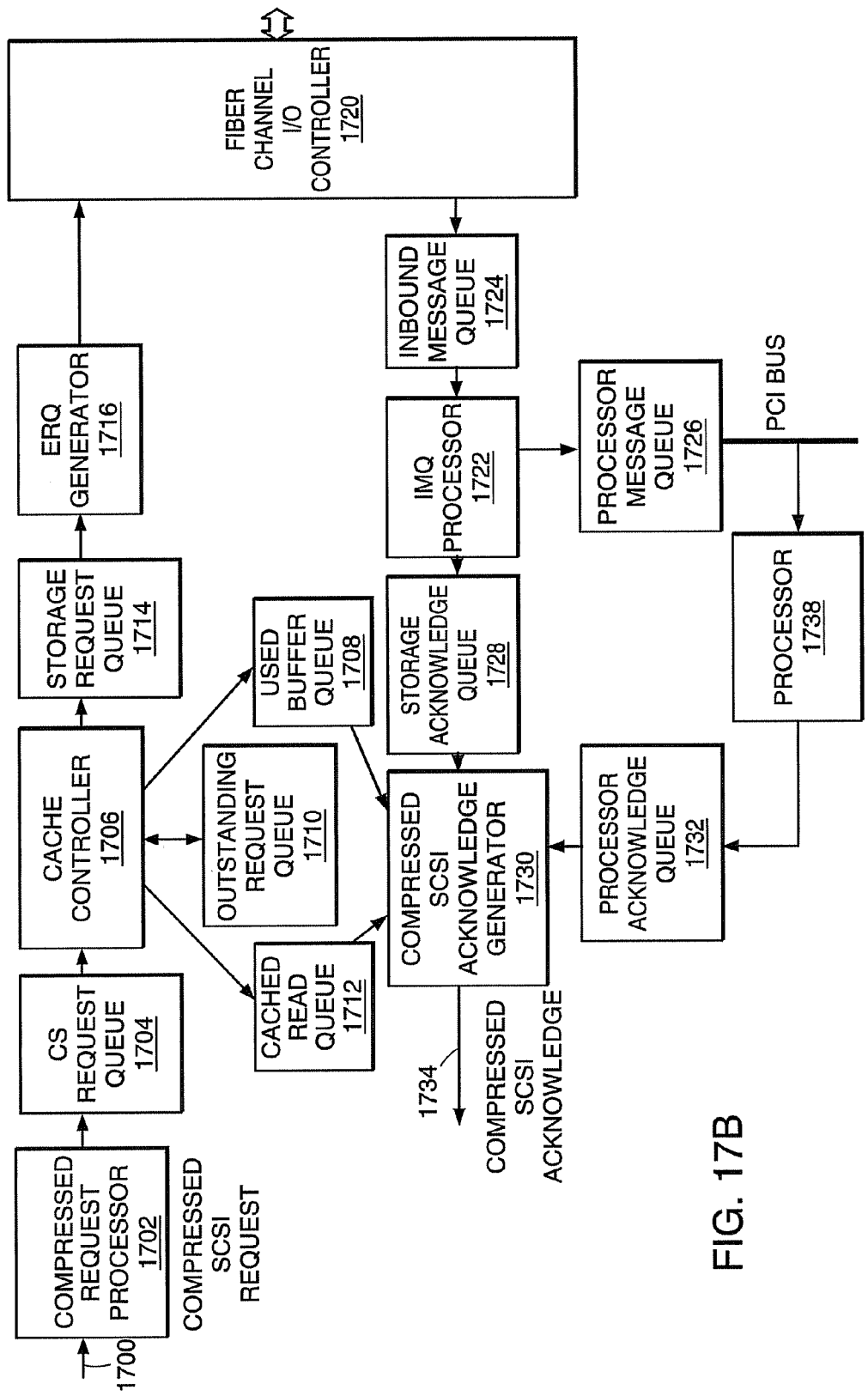
FIG. 17B is a block diagram of control flow in the storage module of FIG. 3.

FIG. 17B is a detailed block diagram showing control flow in the storage module of FIG. 3. When a proto-SCSI requests are received over the proto-SCSI input 1700 by the proto-SCSI request processor 1702, it is assigned a unique identifier (called the SEST index). The information relating to this request is stored in a SEST information table, and if this is a WRITE request, then the WRITE data, which is also provided on the proto-SCSI input 1700, is stored in the WRITE buffer memory 1736. The SEST index is then written into the proto-SCSI request queue 1704.

The cache controller 1706 takes entries out of the proto-SCSI request queue 1704 and the used buffer queue 1708. When an entry is taken out of the proto-SCSI request queue 1704, the information relating to this SEST index is read out of the SEST information table. The cache controller 1706 then works out which disk blocks are required for this transfer and translates this into cache buffer locations using a hash lookup of the disk block number and the disk device to be accessed. If any of the buffers in the write buffer memory 1736 required for this transfer are currently being used by other transfers, then the SEST index is put into the outstanding request queue 1710 to await completion of the other transfers. Otherwise, if this is a READ transfer and all of the required buffers are in the cache, then the SEST index is put into the cached READ queue 1712. Otherwise, the SEST index is written into the storage request queue 1714. A possible enhancement to this algorithm is to allow multiple READs of the same buffer to be in progress simultaneously, provided that the buffer is currently cached.

When an entry is taken out of the used buffer queue 1708, a check is made as to whether any requests were waiting for this buffer to become available. This is done by searching through the outstanding request queue 1710, starting with the oldest requests. If a request is found that was waiting for this buffer to become available, then the buffer is allocated to that request. If the request has all the buffers required for this transfer, then the SEST index is written into the storage request queue 1714 and this request is removed from the outstanding request queue 1710. Otherwise the request is left in the outstanding request queue 1710.

The exchange request generator 1716 takes entries out of the storage request queue 1714 and the partial WRITE queue (not shown). When a SEST index is read out of either queue then the information relating to this SEST index is read out of the SEST information table. If it is a READ transfer then the Fiber Channel I/O controller 1720 is configured to read the data from the appropriate disk. If it is a WRITE transfer and all the buffers to be written are currently cached, or the data to be written completely fills the buffers to be written, then the WRITE can be performed immediately. The data that is to be written is copied from WRITE buffer memory 1736 to the appropriate areas in the cache buffers. The Fiber Channel I/O controller 1720 is then configured to write the data to the appropriate disk. Otherwise, as mentioned above with respect to FIG. 17A, it is necessary to do a READ from the disk before we do a WRITE and initiate a READ of the required data from the appropriate disk.

The IMQ processor 1722 takes messages from the inbound message queue 1724. This is a queue of transfers which the Fiber Channel I/O controller 1720 has completed or transfers which have encountered a problem. If there was a problem with the Fiber Channel transfer then the IMQ processor 1722 will pass a message on to the processor via the processor message queue 1726 to allow it to do the appropriate error recovery. If the transfer was acceptable, then the SEST information is read out for this SEST index. If this transfer was a READ transfer at the start of a WRITE transfer, then the SEST index is written into the partial WRITE queue. Otherwise, it is written into the storage acknowledge queue 1728.

As mentioned with respect to FIG. 17A, the proto-SCSI acknowledge generator 1730 is responsible for generating the proto-SCSI responses. Again, there are three possible sources that can generate proto-SCSI responses, each of which supplies a SEST index. The processor acknowledge queue 1732 is used by the processor 1738 to pass requests that generated errors and that had to be sorted out by the processor 1738 and sent back to the hardware once they have been sorted out. The storage acknowledge queue 1728 is used to pass back Fiber Channel requests which have completed normally. The cached READ queue 1712 is used to pass back requests when all the READ data required is already in the cache and no Fiber Channel accesses are required.

When there is an entry in any of these queues, the SEST index is read out. The SEST information for this index is then read. For all transfers, an identification that allows the proto-SCSI request to be tied up with the acknowledge, along with status information, is returned across the proto-SCSI acknowledge interface 1734. For a READ request, the read data is also returned across the proto-SCSI acknowledge interface 1734. Once the proto-SCSI transfer has been completed, the addresses of all the buffers associated with this transfer are written into the used buffer queue 1708. Any WRITE buffer memory used in this transfer is also returned to the pool of free WRITE buffer memory.

Figure 18:
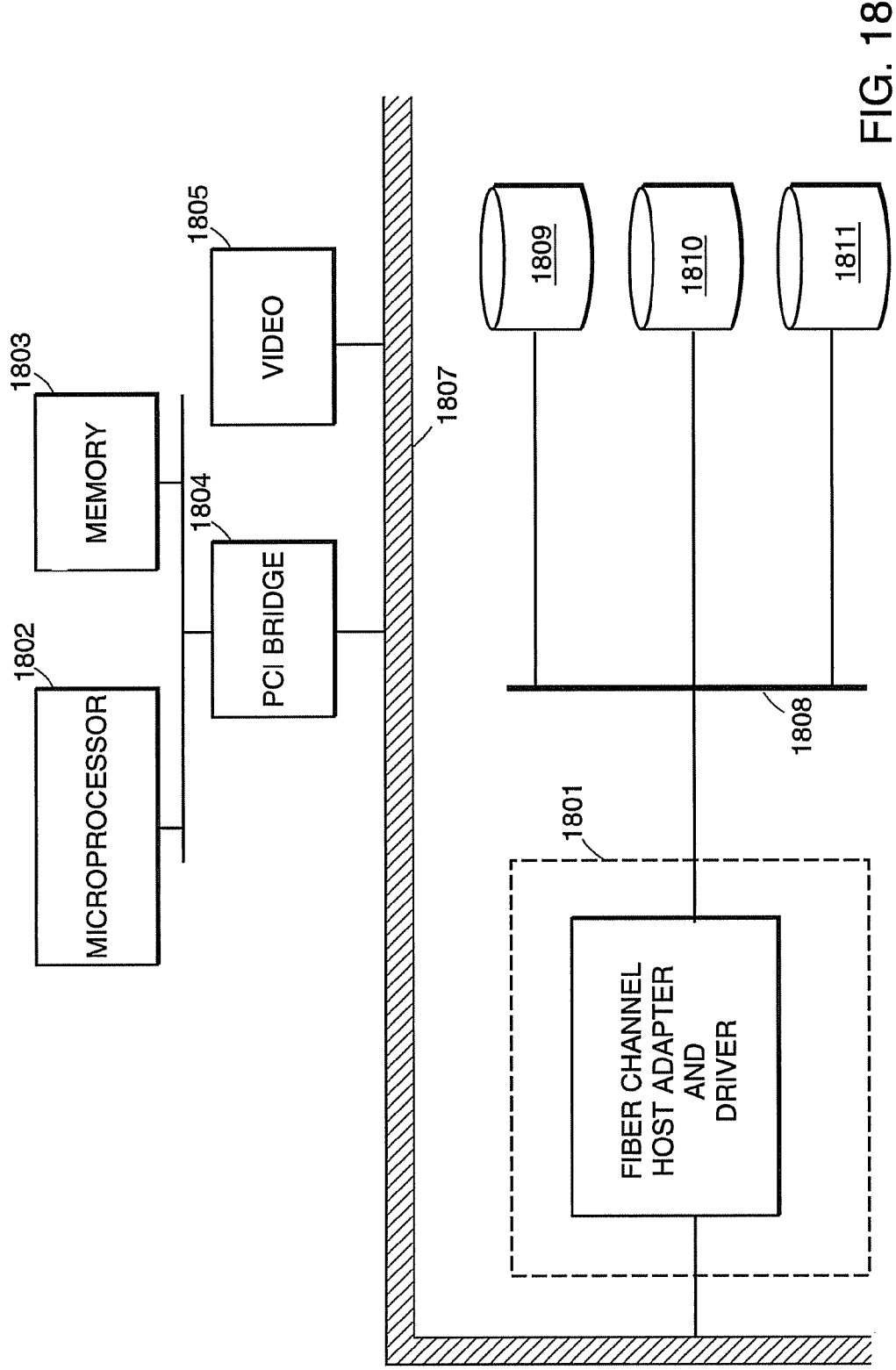
FIG. 18 is a block diagram illustrating use of a storage module, such as illustrated in FIG. 3, in connection with a computer system having file storage.

FIG. 18 is a block diagram illustrating use of a storage module, such as illustrated in FIG. 3, in connection with a computer system having file storage. Here the storage module 1801 acts as a fiber channel host bus adapter and driver for the computer system, which includes microprocessor 1802, memory 1803, a peripheral device, such as a video system 1805, and storage devices 1809, 1810, and 1811. The storage module 1801 is coupled to the microprocessor 1802 and the computer memory 1803 via the PCI bridge 1804 over PCI bus 1807. The storage module 1801 receives requests from the PCI bus and processes the requests in the manner described above with respect to FIGS. 17A and 17B. The storage module 1801 accesses the storage devices 1809, 1810, and 1811 via the storage device access interface 1808.

Figure 19:
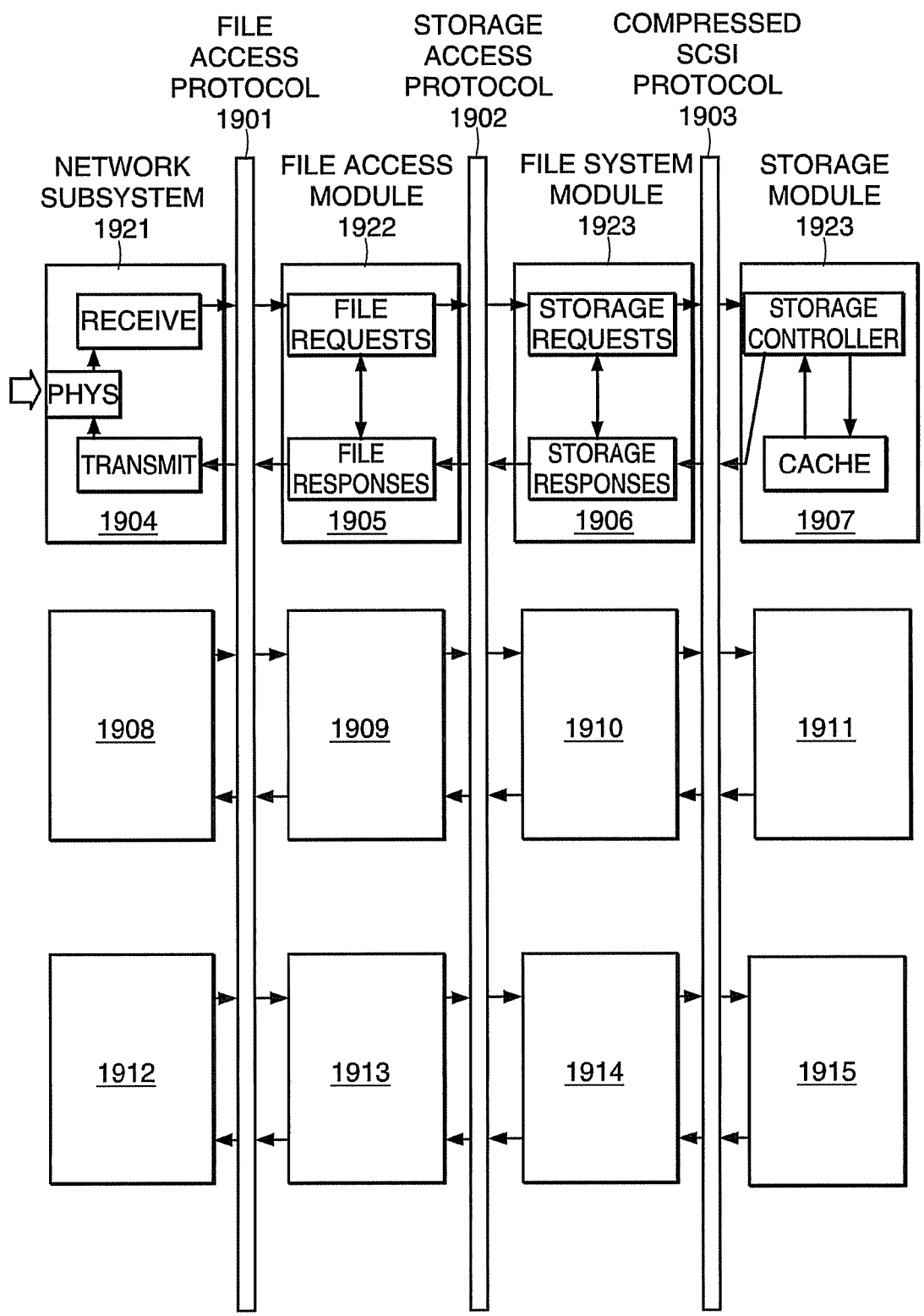
FIG. 19 is a block diagram illustrating scalability of embodiments of the present invention, and, in particular, an embodiment wherein a plurality of network subsystems and service subsystems are employed utilizing expansion switches for communication among ports of successive subsystems and/or modules.

FIG. 19 is a block diagram illustrating scalability of embodiments of the present invention, and, in particular, an embodiment wherein a plurality of network subsystems and service subsystems are employed utilizing expansion switches for establishing communication among ports of successive subsystems and/or modules. To allow extra network connections, to increase the bandwidth capabilities of the unit, and to support a larger number of storage elements, in this embodiment, expansion switches 1901, 1902, 1903 are used to interface a number of modules together. The expansion switch routes any connection from a module on one side of the expansion switch to any module on the other side. The expansion switch is non-blocking, and may be controlled by an intelligent expansion switch control module that takes in a number of inputs and decides upon the best route for a particular connection.

In the embodiment of FIG. 19, the overall system shown utilizes a plurality of network subsystems shown in column 1921 including network subsystem 1904 and similar subsystems 1908 and 1912. The are also a plurality of service subsystems, which are here realized as a combination of file access modules (in column 1922), file system modules (in column 1923), and storage modules (in column 1924). Between each column of modules (and between the network subsystems column 1921 and the file access modules column 1922) is a switch arrangement, implemented as the file access protocol expansion switch 1901, the storage access expansion switch 1902, and the proto-SCSI protocol expansion switch 1903. At the file access protocol level, the expansion switch 1901 dynamically allocates incoming network connections from the network subsystem 1904 to particular file access modules 1905 depending on relevant criteria, including the existing workload of each of the file access modules 1905.

At the storage access protocol level, the expansion switch 1902 dynamically allocates incoming file access connections from the file access modules 1905 to particular file system modules 1906 depending on relevant criteria, including the existing workload of the file system modules 1906. At the proto-SCSI protocol level, the expansion switch 1903 dynamically allocates incoming file system connections to particular storage modules 1907 depending on relevant criteria, including the physical location of the storage element.

Alternatively, the items 1901, 1902, and 1903 may be implemented as buses, in which case each module in a column that accepts an input signal communicates with other modules in the column to prevent duplicate processing of the signal, thereby freeing the other modules to handle other signals. Regardless of whether the items 1901, 1902, and 1903 are realized as buses or switches, it is within the scope of the present invention to track the signal processing path through the system, so that when a response to a file request is involved, the appropriate header information from the corresponding request is available to permit convenient formatting of the response header.

Figure 20:
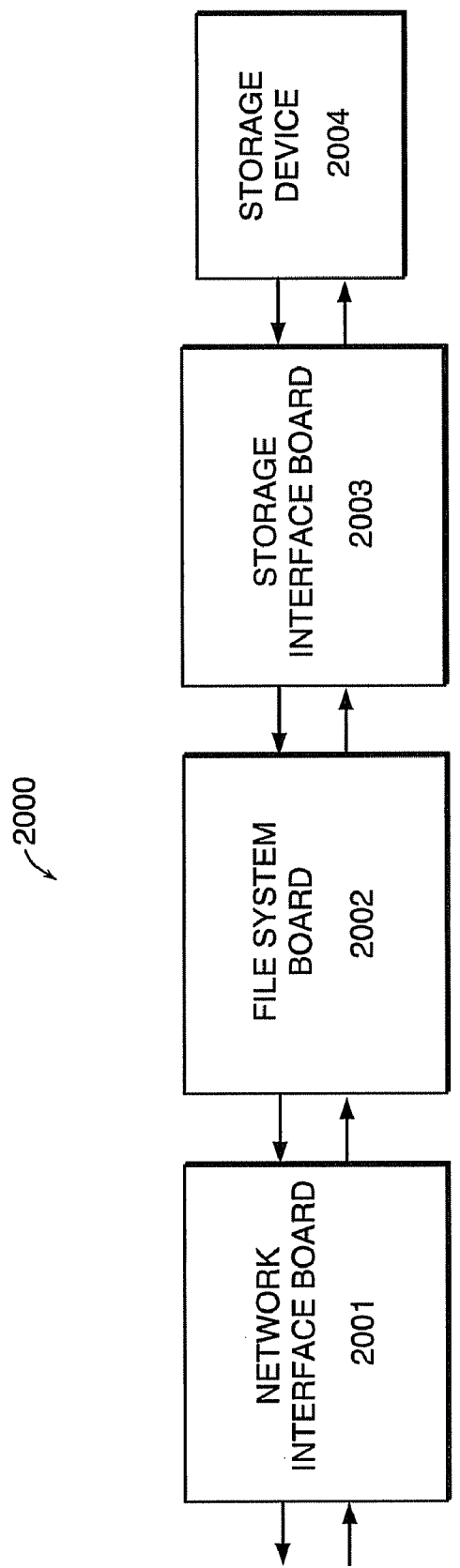
FIG. 20 is a block diagram illustrating a hardware implemented storage system in accordance with an embodiment of the present invention.

FIG. 20 is a block diagram illustrating a hardware implemented storage system in accordance with a further embodiment of the invention. The storage system 2000 includes a network interface board (sometimes called "NIB") 2001, a file system board (sometimes called "FSB") 2002 and a storage interface board (sometimes called "SIB") 2003. The network interface board 2001 implements the network module 31 of FIG. 3 and is in two-way communication with a computer network. The file system board 2002 implements the service module 33 and file system module 34 of FIG. 3. The storage interface board 2003 implements the storage module 35 of FIG. 3. The storage interface board 2003 is in two-way communication with a one or more storage devices 2004.

The network interface board 2001 handles the interface to a Gigabit Ethernet network and runs all the lower level protocols, principally IP, TCP, UDP, Netbios, RPC. It is also responsible for general system management, including the running of a web based management interface. (The storage system 2000 includes a number of parameters that can be modified and a number of statistics that can be monitored. The system 2000 provides a number of methods to access these parameters and statistics. One such method includes connecting to a server associated with the system 2000 remotely, via a Telnet session. Another method includes connecting to a server associated with the system 2000 via a web browser. Thus, a web based management interface process runs on the network interface board's processor to provide the "web site" for a client web browser to access. Other methods to access the above mentioned parameters and statistics may also be used.)

The file system board 2002 runs the key protocols (principally NFS, CIFS and FTP) and also implements an on-disk file system and a file system metadata cache. The storage interface board 2003 handles the interface to a Fibre Channel attached storage and implements a sector cache.

In accordance with the embodiment of FIG. 20, each board has a its own processor as well as a large portion of a dedicated, very large scale integrated circuit ("VLSI") resource in the form of one or more field programmable gate arrays ("FPGA"s). All the processors and all the VLSI blocks have their own dedicated memories of various sizes. In this embodiment, Altera 10K200 FPGAs and Altera 20K600 FPGAs are used. The logic within the FPGAs was designed using the Hardware Description Language VHDL (IEEE-STD 1076-1993) and then compiled to achieve the structures illustrated in FIG. 3 and following.

The boards 2001, 2002, and 2003 of FIG. 20 are coupled to one another with an inter-board "fast-path." The fast-path between any pair of boards consists of two separate connections; one for transmit functions and one for receive functions. The bandwidth of each of these connections is 1280 Mbps. For low bandwidth inter-board communication (for example for certain management tasks) all three boards are also interconnected with a high speed serial connection that runs at 1.5 Mbps.

The essential task of the storage system 2000 is to maintain an on-disk file system and to allow access to that file system via a number of key protocols, principally NFS, CIFS and FTP. Typical operation of the storage system 2000 consists of receiving a CIFS/NFS/FTP request from a client over the ethernet, processing the request, generating the required response and then transmitting that response back to the client.

The Network Interface Board

All network transmit and receive activity is ultimately handled by a gigabit ethernet MAC chip which is connected to the VLSI. Consequently, all packets, at some level, pass through the VLSI. During a receive operation, a packet may be handled entirely by the VLSI (for example, if it is a TCP packet on an established connection) or the VLSI may decide to pass it to the processor for further handling (for example, if it is an ARP packet or a TCP SYN packet).

During a transmit operation, a packet may be handled entirely by the VLSI (for example, if a data transmit request for an established TCP connection has been received from the fast-path) or the packet may be handled by the processor.

In order to process a TCP packet, the network interface board must first establish a TCP connection. Establishing a TCP connection involves the network interface board processor. Once the TCP connection has been established, all subsequent TCP activity on the connection is handled in the VLSI until the connection needs to be closed. The network interface board processor is also involved when the connection is closed. Once the TCP connection has been established, incoming packets are received and processed. The VLSI extracts the TCP payload bytes from each packet. If this is a "plain" TCP connection (used by FTP) then these bytes are immediately passed across the fast-path to the file system board 2002. For Netbios and RPC connections (used by CIFS and NFS respectively) the VLSI reassembles these payload bytes until a complete Netbios or RPC message has been received. At this point, the complete message is pushed across the fast-path by the network interface board 2001 to the file system board 2002.

Typically, the Netbios or RPC message will be a complete CIFS or NFS request. The file system board 2002 processes this as required and then generates a response, which it passes back to the network interface board 2001 via the fast-path. The VLSI then transmits this response back to the client.

The VLSI handles all required TCP functions for both receive and transmit operations, for example, the VLSI generates acknowledgements, measures rtt, re-transmits lost packets, follows the congestion avoidance algorithms, etc. However, all IP layer de-fragmentation encountered during a receive operation requires the involvement of the network interface board processor.

The network interface board 2001 is capable of supporting 65000 simultaneous TCP connections. However, it should be noted that this is an upper limit only, and in practice the number of simultaneous connections that can be supported for any particular higher level protocol (CIFS, FTP, etc.) are likely to be limited by restrictions elsewhere in the system. For example, the amount of memory available for connection specific information on the file system board 2002 may limit the number of simultaneous connection that can be supported.

The network interface board processor is also involved in processing a user datagram protocol packet ("UDP" packet). The network interface board processor handles every received UDP packet. When a UDP packet is received, the network interface board processor is notified. The processor then examines enough of the relevant headers to determine what action is required. One situation of interest occurs when the Network File System operating system, developed by Sun Microsystems, Inc., ("NFS") operates over UDP. In such a situation, the network interface board processor will wait until sufficient UDP packets have been received to form a complete NFS request (this will usually be only one packet, the exception typically being a write request). The processor will then issue a command to the hardware, which will cause the complete NFS request to be passed across the fast-path to the file system board 2002. The file system board 2002 processes this as required and then generates a response that it passes back to the network interface board via the fast-path. The VLSI transmits this response back to the client. For UDP transmit operations the VLSI handles all the required functions. For UDP receive operations the VLSI handles all data movement and checksum verification. However, the header processing on a receive is operation is handled by the network interface board processor as outlined above.

In order to process a File Transfer Protocol ("FTP") operation, each FTP client opens a TCP connection for controlling transfers. For each "put" or "get" request sent on the control connection, a new TCP connection is opened to transfer the data. Clients do not request multiple transfers concurrently, so the maximum number of TCP connections used concurrently is two per client. Each "put" or "get" request causes the data connection to be established, and then the data is received or transmitted by the system 2000. The data transfer rates depend on two factors: 1) the TCP transfer rate; and 2) the disc read/write transfer rate. If data is received from TCP faster than it can be written to disc, then TCP flow control is used to limit the transfer rate as required.

Typically, the client's TCP receive window is used to regulate data transfer to the client. Consequently, TCP transfer rates also depend on the TCP window size (the storage system 2000 uses 32120 for receive window), round trip time (the time taken to receive an acknowledgement for transmitted data), and the packet loss rate. Further, in this embodiment, there are 128 MBytes of receive buffer memory and 128 MBytes of transmit buffer memory. If the receive buffer memory becomes full, receive packets will be dropped. Similarly, if the transmit buffer memory becomes full, the network interface board 2001 will stop accepting data from the file system board 2002.

The File System Board

The file system board 2002 has effectively three separate sections: the file system receive module, the file system transmit module, and the file system copy module. Each section contains separate data paths, separate control memory and separate buffer memory. The only shared resource is the host processor, which can access all areas.

Figure 21:
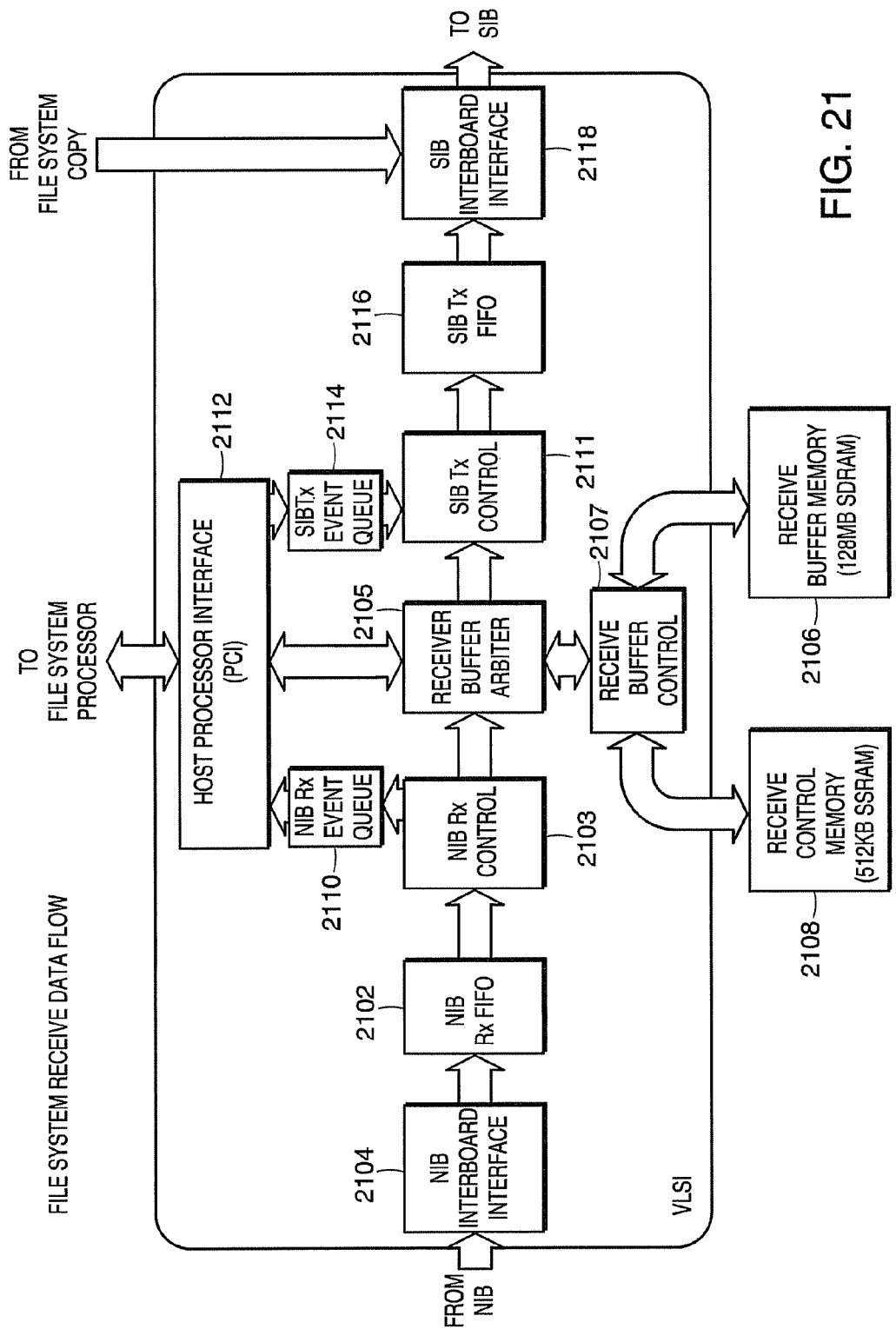
FIG. 21 is a block diagram illustrating data flow associated with the file system receive module of the embodiment of FIG. 20.

FIG. 21 is a block diagram illustrating the data flow associated with the file system module of the embodiment of FIG. 20. The file system receive of this embodiment is analogous to the receive aspect of embodiment of FIG. 13. The file system receive module receives data from the network interface board 2001 via the network interface board inter-board interface 2104 and transmits data to the storage interface board 2003. Incoming data frames from the network interface board 2001 are transmitted to a receive buffer arbiter 2105 via the "file system receive" network interface board receive FIFO 2102 and network interface board receive control block 2103. The frames are written into free buffers in the file system receive buffer memory 2106, via the receive buffer arbiter 2105 and the receive buffer control block 2107.

The receive buffer arbiter 2105 decides which of multiple requests which may be received will be allowed to access the file system receive buffer memory 2106. The receive buffer control block 2107 provides a link function to link multiple buffers together when a request straddles more than one buffer. The file system receive buffers are 2 KBytes long, thus one incoming frame may straddle a number of receive buffers. As frames are written into file system receive buffer memory 2106, receive buffer descriptors are updated in the file system receive control memory 2108.

When a complete frame has been written to the file system receive buffer memory 2106, an entry is written to the network interface board receive event queue 2110 (which exists as a linked list in the file system receive control memory 2108) and an interrupt to the host processor is generated. The host processor, through the host processor interface 2112, reads the entry in the network interface board receive event queue 2110. From the information contained in the network interface receive event buffer locator (which is read from the queue 2110), the host processor determines the address of the first buffer of the frame in the file system receive buffer memory 2106. The host processor will then use DMA to transmit the file protocol header from the file system receive buffer memory 2106 into the host processor's local memory. Once the host processor has analyzed the file protocol request, one or more of the following actions may be taken:

1) If the request is a write request, a storage interface request header is constructed in file system receive buffer memory 2106. A buffer locator and buffer offset pair for this header is written to the storage interface board transmit event queue 2114. A buffer locator and buffer offset pair for the write data (which is still held in file system receive buffer memory 2106) is also written to the storage interface board transmit event queue 2114.

2) A storage interface request frame will be constructed in the file system receive buffer memory 2106. The request is queued to be sent by writing a buffer locator and buffer offset pair to the storage interface board transmit event queue 2114.

Figure 22:
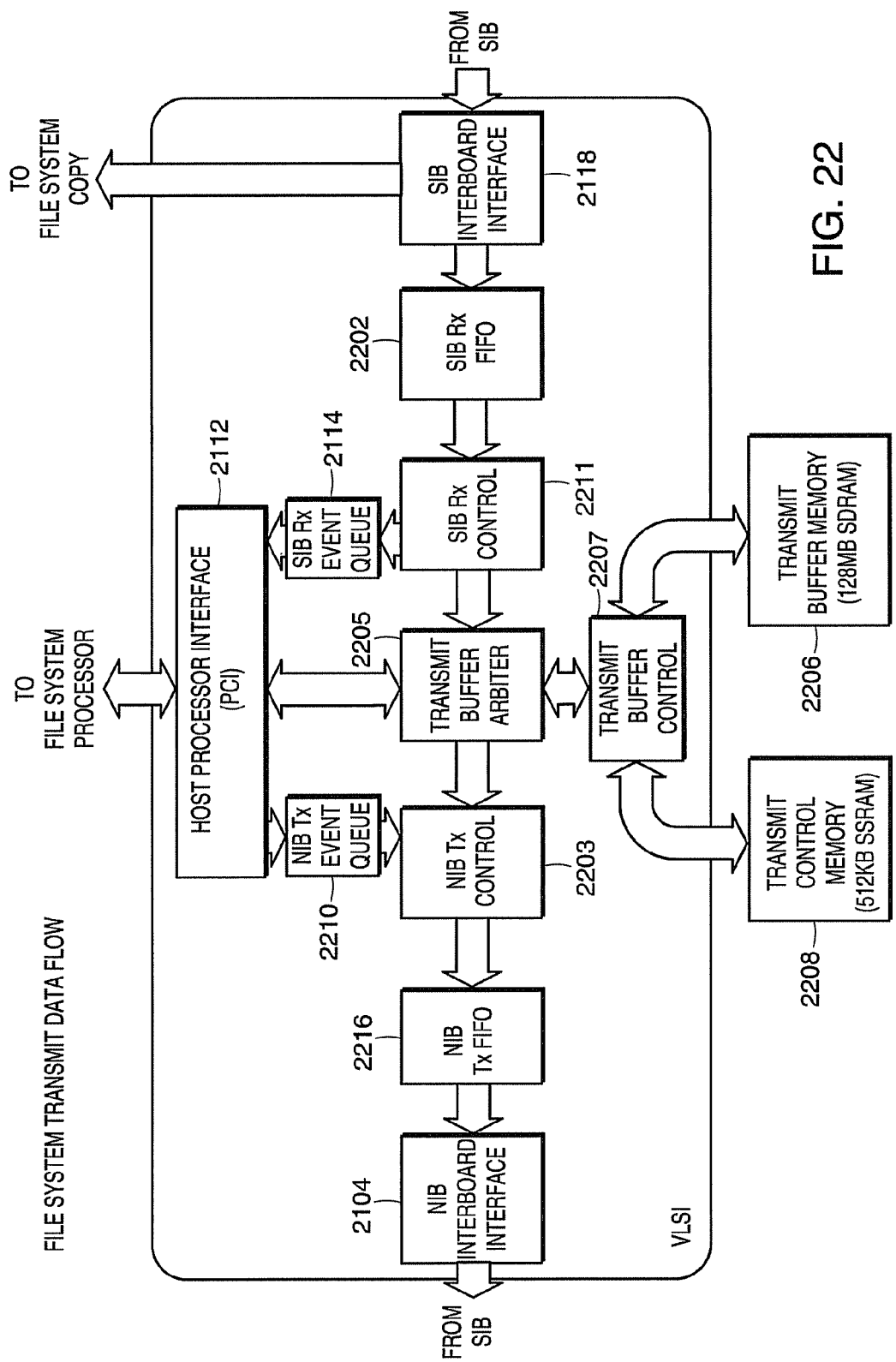
FIG. 22 is a block diagram illustrating data flow associated with the file system transmit module of the embodiment of FIG. 20.

3) A file protocol response frame will be constructed in the file system transmit buffer memory 2206 shown in FIG. 22. The request is queued to send by writing a buffer locator and buffer offset pair to the network interface board transmit event queue 2210. Receive buffers that are no longer required are returned to the free buffers queue by writing their buffer locators to the return free buffers register.

The storage interface transmit process is driven by the storage interface board transmit event queue 2114. Entries in the storage interface board transmit event queue 2114 are read automatically by the hardware process. The entries consist of buffer locator and buffer offset pairs which provide enough information for a storage interface request frame to be constructed from fragments in the receive buffer memory 2106. Data is read from receive buffer memory 2106, aligned as necessary and transferred into the storage interface board transmit FIFO 2116 via the storage interface board transmit control block 2111.

When data is present in the storage interface board transmit FIFO 2116, a request is made to the storage interface board, via the storage interface board inter-board interface 2118, to transmit a storage interface request. The storage interface block will only allow transmission when it has enough resource to handle the request. When data from buffers has been transferred into the storage interface board transmit FIFO 2116, the buffers are freed back into the free buffers queue. The storage interface transmit process can forward storage interface requests from the storage interface copy process shown in FIG. 23. Requests from the copy process have highest priority.

The file system receive buffer memory 2106 contains 65536 receive buffers. The receive control memory 2108 contains 65536 receive descriptors. Thus, 128 Mbytes of data from the network interface block 2001 can be buffered here.

The network interface board receive event queue 2110 and the storage interface board transmit event queue 2114 can both contain 32768 entries. One incoming file protocol request will typically require two entries in the receive queue 2110, limiting the number of buffered requests to 16384. If the receive queue 2110 becomes full, no more incoming requests will be accepted from the network interface board 2001. A storage interface request will typically require up to four entries in the transmit queue 2114, limiting the number of buffered requests to 8192. When the transmit queue 2114 becomes full, the host processor will stall filling the queue but will be able to continue with other actions.

In summary the limits are: 128 MBytes of data buffering, approximately queuing for 16384 incoming file protocol requests and approximately queuing for 8192 storage interface requests. Data from the network interface board 2001 is only accepted if there are resources within this section to store a maximum length frame of 128 KBytes. Thus when this buffer space is exhausted or the receive queue 2110 becomes full, the network interface board 2001 will be unable to forward its received frames.

FIG. 22 is a block diagram illustrating data flow associated with the file system transmit module of the embodiment of FIG. 20. The file system transmit of this embodiment is analogous to the transmit aspect of embodiment of FIG. 13. This file system transmit module receives data from the storage interface board 2003 via the storage interface board inter-board interface 2118 and transmits data to the network interface board 2001.

Incoming non-file system copy responses from the storage interface board are transmitted to a transmit buffer arbiter 2205 via the "file system transmit" storage interface board receive FIFO 2202 and the storage interface board receive control block 2211. The non-file system copy responses are written into free buffers in the file system transmit buffer memory 2206 via the transmit buffer arbiter 2205 and the transmit buffer control block 2207. (The transmit buffer arbiter 2205 and transmit buffer control block 2207 provide functions similar to those provided by the receive buffer arbiter 2105 and the receive buffer control block 2107.) The transmit buffers are 2 KBytes long and thus one incoming frame may straddle a number of transmit buffers. As responses are written into transmit buffer memory 2206, transmit buffer descriptors are updated in the transmit control memory 2208.

When a complete response has been written to the transmit buffer memory 2206, an entry is written to the storage interface board receive event queue 2214 (which exists as a linked list in the transmit control memory 2208) and an interrupt to the host processor is generated via the host processor interface 2112.

The host processor reads the entry in the storage interface board receive event queue 2214. From the information contained in the storage interface receive event buffer locator (which is read from the queue 2214), the host processor determines the address of the first buffer of the response in the transmit buffer memory 2206. The host processor will then DMA the response header from the transmit buffer memory 2206 into its local memory. Once the host processor has analysed the response, one or more of the following actions may be taken:

1) If the request is a read request, a file protocol response header is constructed in the transmit buffer memory 2206. A buffer locator and buffer offset pair for this header are written to the network interface board transmit event queue 2210. A buffer locator and buffer offset pair for the read data (which is still held in transmit buffer memory 2206) are written to the network interface transmit event queue.

2) A file protocol response frame is constructed in transmit buffer memory 2206. The request is queued to send by writing a buffer locator and buffer offset pair to the network interface transmit event queue 2210.

3) Transmit buffers that are no longer required are returned to the free buffers queue by writing their buffer locators to the return free buffers register.

The network interface transmit process is driven by the network interface board transmit event queue 2210. Entries in the queue 2210 are read automatically by the hardware process. The entries consist of buffer locator and buffer offset pairs which provide enough information for a file protocol response frame to be constructed from fragments in the transmit buffer memory 2206. Data is read from transmit buffer memory 2206, aligned as necessary and transferred into the network interface board transmit FIFO 2216 via the network interface board transmit control block 2203.

When data is present in the network interface board transmit FIFO 2216, a request is made to the network interface board 2001 via the network interface board inter-board interface 2104 to transmit a network interface request. The network interface block 2001 will only allow transmission when it has enough resource to handle the request. When data from buffers has been transferred into the transmit FIFO 2216, the buffers are freed back into the free buffers queue.

The file system transmit buffer memory 2206 contains 65536 transmit buffers. The transmit control memory 2208 contains 65536 transmit descriptors. Thus 128 Mbytes of data from the storage interface bock 2003 can be buffered here. The storage interface receive event queue 2214 and the network interface transmit event queue 2210 can both contain 32768 entries. One incoming storage interface response will typically require two entries in the receive queue 2214, limiting the number of buffered requests to 16384. If the receive queue 2214 becomes full, no more incoming requests will be accepted from the storage interface board 2003. A network interface request will typically require up to four entries in the transmit queue 2210, limiting the number of buffered requests to 8192. When the transmit queue 2210 becomes full, the host processor will stall filling the queue but will be able to continue with other actions.

In summary the limits are: 128 MBytes of data buffering, approximately queuing for 16384 incoming storage interface responses and approximately queuing for 8192 file protocol responses. Data from the storage interface board 2003 is only accepted if there are resources within this section to store a maximum length response of 128 KBytes. Thus when this buffer space is exhausted or the receive queue 2214 becomes full, the storage interface board 2003 will be unable to forward its responses.

Figure 23:
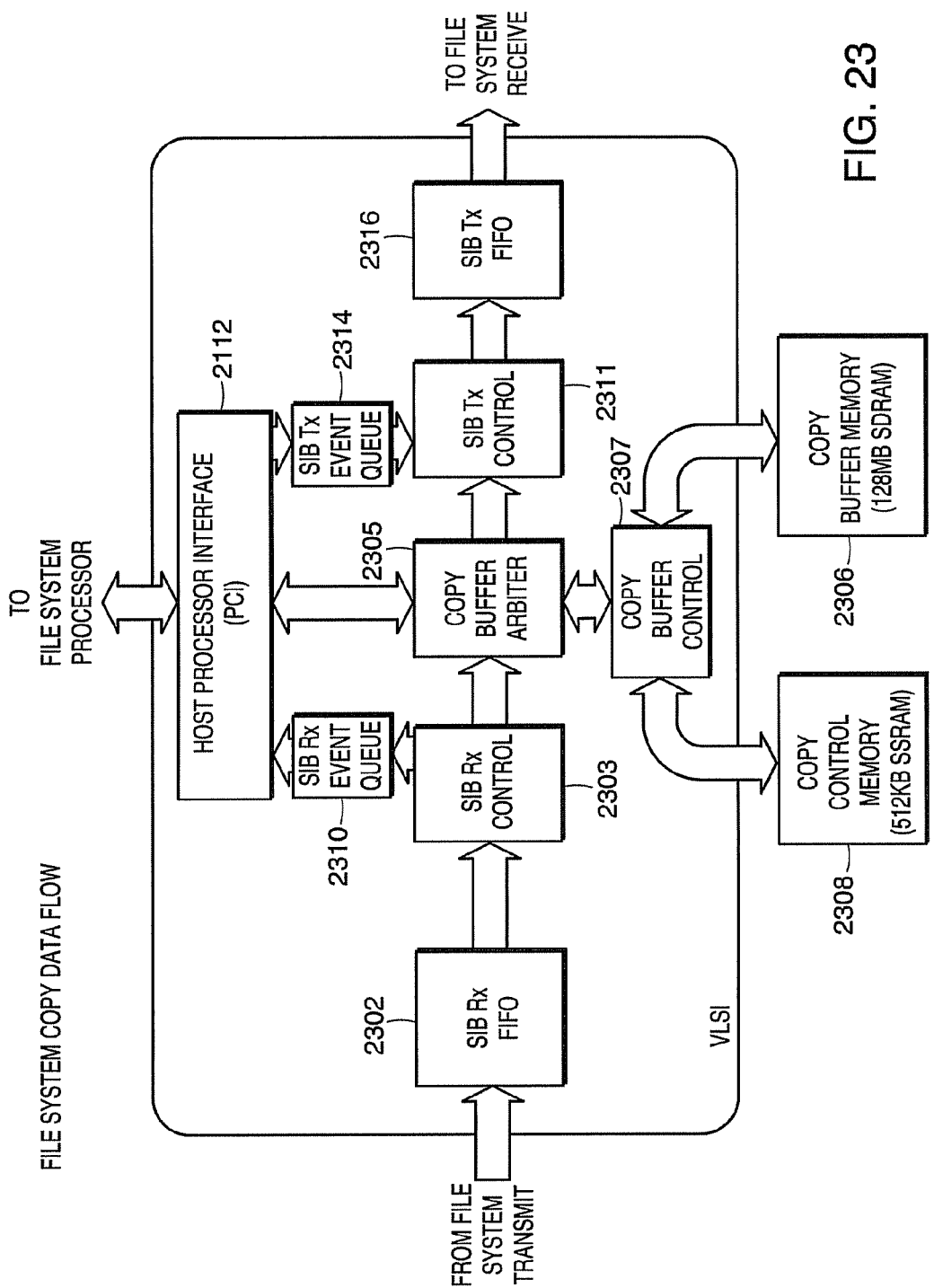
FIG. 23 is a block diagram illustrating data flow associated with the file system copy module of the embodiment of FIG. 20.

FIG. 23 is a block diagram illustrating data flow associated with the file system copy module of the embodiment of FIG. 21. This file system copy module receives data from the storage interface board 2003 and retransmits the data back to the storage interface board 2003.

Incoming file system copy responses from the storage interface board 2003 are transmitted to a copy buffer arbiter 2305 via the "file system copy" storage interface board copy receive FIFO 2302 and the storage interface board copy receive control block 2303. The file system copy responses are written into free buffers in the file system copy buffer memory 2306, via the copy buffer arbiter 2305 and the copy buffer control block 2307. Again, the copy buffer arbiter 2305 and the copy buffer control block 2307 provide functions similar to those provided by the receive and transmit buffer arbiters 2105 and 2205 and the receive and transmit buffer control blocks 2107 and 2207. The copy buffers are 2 KBytes long and thus one incoming response may straddle a number of copy buffers.

As responses are written into copy buffer memory 2306, copy buffer descriptors are updated in the copy control memory 2308. When a complete response has been written to the copy buffer memory 2306, an entry is written to the storage interface board copy receive event queue 2310 (which exists as a linked list in the copy control memory 2306) and an interrupt to the host processor is generated.

A storage interface request frame is constructed in the copy buffer memory 2306. The request is queued to be sent by writing a buffer locator and buffer offset pair to the storage interface board copy transmit event queue 2314. When the response is received, the host processor reads the entry from the storage interface board copy receive event queue 2310.

From the information contained in the copy receive event buffer locator (which is read from the queue 2310), the host processor determines the address of the first buffer of the response in the copy buffer memory 2306. The host processor can then DMA the response header from the copy buffer memory 2306 into its local memory. Once the host processor has analyzed the response, it can modify the header to the appropriate storage interface request. The request is queued to be sent by writing a buffer locator and buffer offset pair to the storage interface board copy transmit event queue 2314.

The copy transmit process is driven by the copy transmit event queue 2314. Entries in the queue 2314 are read automatically by the hardware process. The entries consist of buffer locator and buffer offset pairs which provide enough information for a storage interface request frame to be constructed from fragments in the copy buffer memory 2306. Data is read from copy buffer memory 2306, aligned as necessary and transferred into the storage interface board copy transmit FIFO 2316 via the storage interface board copy transmit control block 2311. When data is present in the copy transmit FIFO 2316, a request is made to the file system storage interface transmit process board to transmit a storage interface request. When data from buffers has been transferred into the copy transmit FIFO 2316, the buffers are freed back into the free buffers queue.

The file system copy buffer memory 2306 contains 65536 copy buffers. The copy control memory 2308 contains 65536 copy descriptors. Thus 128 Mbytes of data can be buffered here. The copy receive event queue 2310 and the copy transmit event queue 2314 can both contain 32768 entries. One incoming response will typically require two entries in the receive queue 2310, limiting the number of buffered requests to 16384. If the receive queue 2310 becomes full, no more incoming requests will be accepted from the storage interface board 2003. A storage interface request will typically require two entries in the transmit queue 2314, limiting the number of buffered requests to 16384. When the transmit queue 2314 becomes full, the host processor will stall filling the queue but will be able to continue with other actions.

In summary the limits are: 128 MBytes of data buffering, approximately queuing for 16384 incoming response and approximately queuing for 16384 requests. Data from the storage interface board 2003 is only accepted if there are resources within this section to store a maximum length frame of 128 KBytes. Thus when this buffer space is exhausted, or the receive queue 2310 becomes full, the storage interface board 2003 will be unable to forward its received frames.

Server Protocol and File System Software

Once a message has been wholly received by the file system board hardware, an event is sent to the CPU via an interrupt mechanism, as described elsewhere in this document. A BOSSOCK sockets layer will service the interrupt and read a connection identifier from the hardware buffer and queue the message against the appropriate connection, also calling the registered receiver function from that connection. Typically this receiver function will be the main message handler for the SMB, NFS or FTP protocol. The receiver function will read more of the incoming message from the hardware buffer to enable determination of the message type and the appropriate subsequent action as described below.

For illustration purposes, we will take the example of an SMB message being received, specifically an SMB WRITE command. This command takes the form of a fixed protocol header, followed by a variable command header, followed by the command payload, in this case the data to be written.

The receiver function for the SMB protocol first reads in the fixed protocol header from the hardware buffer, which is a fixed length at a fixed offset. Based on the contents of this protocol header, the command type and length can be determined. The relevant specialized command handler function is then invoked and passed the received command. This handler function will read in the variable command header associated with the command type, which in the case of a write operation will contain a file handle for the file to be written to, the offset within the file and the length of data to write. The file handle is resolved to an internal disk filing system representation.

This information is passed down to the disk filing system, along with the address of the hardware buffer that contains the data payload to be written to the file. The file system will update the metadata relating to the file being written to, within it's metadata cache in memory, then issue a disk WRITE command to the file system board hardware that contains the physical disk parameters where the new data should be written to and the location of the data payload in hardware buffer memory to write to disk. The payload data itself does not get manipulated by the CPU/software and at no point gets copied into CPU memory.

Once the file system responds having (at least) initiated the write to disk by sending the disk write command to the file system board hardware, the protocol handler function will queue the response packet to the client for transmission. At this point, the modified file metadata is in CPU memory, and what happens to it is determined by the metadata cache settings.

The metadata cache can be in one of two modes, write-back or write-through, with the default being write-back. In write-back mode, the updated metadata will remain in memory until one of two conditions is met: 1) the metadata cache logging timeout is reached or 2) the amount of modified metadata for a given volume exceeds a predetermined value (currently 16 MB). If the either of these conditions is met, an amount of modified metadata will be written to the file system board hardware for transmission to the disk, possibly using transaction logging if enabled.

In write-back mode, the metadata is not written all the way to the disk before the software continues, it is just written to the hardware buffers. There is recovery software that will enable the system to recover metadata that has been written to the hardware buffers if a crash occurs before the hardware has committed the metadata to the physical disk. This will obviously not happen if fail over is configured and the primary fails causing the standby unit to take control. In write-through mode, any metadata modified by an individual file system transaction will be written to the file system board hardware at the end of the transaction, again possibly using transaction logging if enabled, to be sent to the sector cache and thus to the disk as a "best effort". In either of these modes, the metadata written to the hardware by the file system is transmitted to the sector cache on the file system board and will be handled by that subsystem as defined by it's current caching mode (i.e., if the sector cache is in write-back mode, the metadata may be cached for up to the timeout period of the sector cache.

The Storage Interface Board

On the storage interface board 2003 all of the fibre channel management, device management and error recovery are handled by the storage system board processor. All disk and tape reads and writes are handled by the VLSI, unless there are any errors, in which case the processor gets involved.

The sector cache on the storage interface board 2003 is arranged as 32 Kbyte buffers, each of which can cache any 32 Kbyte block on any of the system drives attached to the storage system 2000. Each 32 Kbyte block is further subdivided into 32 1 Kbyte blocks, each of which may or may not contain valid data.

When a READ request is received from the file system board 2002, the VLSI first checks to see whether the 32 Kbyte buffers required for this transfer are mapped into the cache. If not, then buffers are taken from the free buffer queue and mapped to the required disk areas. If any of the 32 Kbyte buffers are mapped into the cache, the VLSI checks whether all of the 1 Kbyte blocks required for this transfer are valid in the cache buffers. Disk reads are then issued for any unmapped or invalid areas of the read request. Once all the data required for the read is valid in the cache, the VLSI then transmits the read data back to the file system board 2002.

When the cache is in write through mode, the VLSI first copies the write data from the file system board 2002 into buffers in the write memory. It then checks to see whether the 32 Kbyte buffers required for this transfer are mapped into the cache. If not, then buffers are taken from the free buffer queue and mapped to the required disk areas. If the start and/or end of the transfer are not on 1 Kbyte boundaries, and the start and/or end 1 Kbyte blocks are not valid in the cache, then the start and/or end blocks are read from the disk. The write data is then copied from the write memory to the appropriate place in the sector cache. Finally the 1 Kbyte blocks which have been modified ("dirty" buffers) are written to the disk.

When the cache is in write back mode, the process is identical to a write request mode in write through mode except that the data is not written back to the disk as soon as the write data has been copied into the cache. Instead the dirty buffers are retained in the sector cache until either the number of dirty 32 Kbyte buffers, or the time for which the oldest dirty buffer has been dirty, exceeds the user programmable thresholds. When this happens, the dirty data in the oldest dirty buffer is written to the appropriate disk.

On the storage interface board 2003, 2 Gbytes of sector cache memory are fitted. This is arranged as 65536 buffers, each of which can buffer up to 32 Kbytes of data. The write memory is 128 Mbytes in size, arranged as 4096 32 Kbyte buffers. If the write memory becomes full, or the sector cache becomes full of dirty data, the disk card will stop processing incoming requests from the SMB card until some more resources become available.

What is claimed is:

1. A file system adapter card that may be plugged into a host computer system for providing hardware-based file system accesses outside the purview of the host system, the file system adapter card comprising:
a file service subsystem that receives file service requests and fulfills such service requests and in doing so may issue storage arrangement access requests to a storage arrangement; and
a computer bus, coupled to the file service subsystem, that permits the host system to communicate directly with the file service subsystem for providing file service requests and receiving file service responses;
wherein the file service subsystem includes dedicated hardware that operates outside the immediate control of the host system, the dedicated hardware including specialized circuitry for performing at least one major file service function for the host system.

2. A file system adapter card according to claim 1, wherein the computer bus is a PCI bus.

3. A file system adapter card according to claim 1, wherein the dedicated hardware includes specialized circuitry for performing a predetermined set of major file service functions.

4. A file system adapter card according to claim 3, wherein the dedicated hardware includes at least one integrated circuit.

5. A file system adapter card according to claim 4, wherein the at least one integrated circuit includes at least one field programmable gate array.

6. A file system adapter card according to claim 3, wherein the dedicated hardware includes a dedicated memory.

7. A file system adapter card according to claim 1, wherein the file service subsystem further comprises a processor in communication with the dedicated hardware, the processor running a software program, the dedicated hardware operating outside the immediate control of the software program.

8. A file system adapter card according to claim 7, wherein the file service subsystem further comprises a memory coupled to the processor but not to the dedicated hardware.

9. A file system adapter card according to claim 8, wherein the dedicated hardware directs at least one class of service requests to the processor for processing by the software program.

10. A file system adapter card according to claim 8, wherein the dedicated hardware services at least one class of service requests without directing the service requests to the processor.

11. A file system adapter card according to claim 1, wherein the file service subsystem comprises:
a service receive block, coupled to the storage arrangement, that processes the storage access request, generates where necessary an access to the storage arrangement, and causes the generation of a response;
a file table cache, coupled to the service receive block, that stores a table defining the physical location of files in the storage arrangement; and
a service transmit block, coupled to the service receive block, for transmitting the response;
wherein at least one of the service receive block and the service transmit block includes dedicated hardware that operates outside the immediate control of the host operating system, the dedicated hardware including specialized circuitry for performing at least one major block function.

12. A file system adapter card according to claim 11, wherein the computer bus is coupled to each of the service receive block and the service transmit block.

13. A file system adapter card according to claim 11, wherein the file service subsystem further comprises:
a response information memory, coupled to each of the service receive block and the service transmit block, which memory stores information present in a header associated the request, which information is used by the service transmit block in constructing the response.

14. A file system adapter card according to claim 1, wherein the file service subsystem comprises:
a service module that receives file service requests and fulfills such service requests and in doing so may issue data storage access requests; and
a file system module, coupled to the service module, that receives data storage access requests from the service module and fulfills such storage access requests and in doing so may issue storage arrangement access requests; and
wherein at least one of the service module and the file system module includes dedicated hardware that operates outside the immediate control of the host operating system, the dedicated hardware including specialized circuitry for performing at least one major module function.

15. A file system adapter card according to claim 14, wherein each of the service module and the file system module includes dedicated hardware that operates outside the immediate control of the host operating system, the dedicated hardware including specialized circuitry for performing at least one major module function.

16. A file system adapter card according to claim 15, wherein the dedicated hardware of each module includes at least one integrated circuit.

17. A file system adapter card according to claim 16, wherein the dedicated hardware of each module includes at least one field programmable gate array.

18. A file system adapter card according to claim 14, wherein at least one of the service module and the file system module includes a processor in communication with the dedicated hardware of the module, the processor running a software program, the dedicated hardware operating outside the immediate control of the software program.

19. A file system adapter card according to claim 14, wherein the service module includes:
  a receive control engine that receives network service requests, determines whether such requests are appropriate, and if so, responds if information is available, and otherwise issues a data storage access request; and
  a transmit control engine that generates network service responses based on instructions from the receive control engine, and, in the event that there is a data storage access response to the data storage access request, processes the data storage access response;
  wherein at least one of the receive control engine and the transmit control engine includes dedicated hardware that operates outside the immediate control of the host operating system, the dedicated hardware including specialized circuitry for performing at least one major engine function.

20. A file system adapter card according to claim 14, wherein the file system module comprises:
  a file system receive engine that receives and interprets such data storage access requests and in doing so may issue storage device access requests; and
  a file system transmit engine, coupled to the file system receive engine, that constructs and issues data storage access responses, wherein such responses include information when appropriate based on responses to the storage device access requests;
  wherein at least one of the file system receive engine and the file system transmit engine includes dedicated hardware that operates outside the immediate control of the host operating system, the dedicated hardware including specialized circuitry for performing at least one major engine function.

21. A file system adapter card according to claim 20, wherein the storage device access requests are consistent with the protocol used by a storage device to which the module may be coupled.

22. A file system adapter card according to claim 21, wherein the protocol includes one of NTFS, HPFS, FAT, FAT16, and FAT32.

23. A file system adapter card according to claim 20, further comprising a file table cache, coupled to the file system receive engine, that stores a table defining the physical location of files in a storage device to which the module may be coupled.

24. A file system adapter card according to claim 23, wherein the protocol does not require files to be placed in consecutive physical locations in a storage device.

25. A file system adapter card according to claim 1, further comprising:
  a storage module, coupled to the file service subsystem, that receives storage arrangement access requests from the file service subsystem and controls a storage arrangement to fulfill such storage arrangement access requests.

26. A file system adapter card according to claim 25, wherein the storage module includes dedicated hardware that operates outside the immediate control of the host operating system, the dedicated hardware including specialized circuitry for performing at least one major storage module function.

27. A file system adapter card according to claim 26, wherein the dedicated hardware of the storage module includes at least one integrated circuit.

28. A file system adapter card according to claim 27, wherein the dedicated hardware of the storage module includes at least one field programmable gate array.

29. A file system adapter card according to claim 26, wherein the storage module includes a processor in communication with the dedicated hardware of the storage module, the processor running a software program, the dedicated hardware operating outside the immediate control of the software program.

30. A file system adapter card according to claim 26, wherein the storage module is in communication with a storage device controller to fulfill such storage access requests, and wherein the storage module comprises:
  a storage device request interface that receives such storage device access requests and translates them into a format suitable for the storage device controller; and
  a storage device acknowledge interface that takes the responses from the storage device controller and translates such responses into a format suitable for the request source;
  wherein at least one of the storage device request interface and the storage device acknowledge interface includes dedicated hardware that operates outside the immediate control of the host operating system, the dedicated hardware including specialized circuitry for performing at least one major interface function.

31. A file system adapter card according to claim 30, wherein the storage module further comprises:
  a cache controller that maintains a local copy of a portion of data contained on the storage device to allow fast-read access to the portion of data.

32. A file system adapter card according to claim 30, wherein the storage device request interface and the storage device acknowledge interface are coupled to a port permitting communication with the storage device controller over a fiber-optic channel.

33. A file system adapter card according to claim 30, wherein the storage device request interface and the storage device acknowledge interface are coupled to a port permitting communication with the storage device controller utilizing a SCSI-related protocol.

34. A file system adapter card according to claim 1, further comprising:
  a network subsystem, coupled to the file service subsystem, that receives network service requests over a network and fulfills such network service requests and in doing so may issue file storage requests to the file service subsystem.

35. A file system adapter card according to claim 34, wherein the network subsystem includes dedicated hardware that operates outside the immediate control of the host operating system, the dedicated hardware including specialized circuitry for performing at least one major subsystem function.

36. A file system adapter card according to claim 35, wherein the dedicated hardware of the network subsystem includes at least one integrated circuit.

37. A file system adapter card according to claim 36, wherein the dedicated hardware of the network subsystem includes at least one field programmable gate array.

38. A file system adapter card according to claim 35, wherein the network subsystem includes a processor in communication with the dedicated hardware of the network subsystem, the processor running a software program, the dedicated hardware operating outside the immediate control of the software program.

39. A file system adapter card according to claim 34, wherein the network subsystem and the file service subsystem are interconnected by a receive pipe that permits the network subsystem to provide file service requests to the file service subsystem and by a transmit pipe that permits the network subsystem to receive file service responses from the file service subsystem.

40. A file system adapter card according to claim 39, wherein the file service subsystem includes a service receive block coupled to the receive pipe and a service transmit block coupled to the transmit pipe.

41. A file system adapter card according to claim 1, wherein the file service requests include one of reading and writing data to long-term electronic storage.

42. A file system adapter card according to claim 41, wherein the long-term storage is network disk storage accessible to computers over a network.

43. A file system adapter card according to claim 41, wherein the long-term storage is local disk storage that is accessible to the host computer system but not to any other computers over a network.

44. A file system adapter card according to claim 41, wherein the long-term storage is associated with the provision of E-Mail service over a network.

45. A file system adapter card according to claim 41, wherein the long-term storage provides access to web pages over a network.

* * * * *